US009322726B2

(12) United States Patent
Fukuzawa et al.

(10) Patent No.: US 9,322,726 B2
(45) Date of Patent: Apr. 26, 2016

(54) PRESSURE SENSOR, ACCELERATION SENSOR, AND METHOD FOR MANUFACTURING PRESSURE SENSOR

(71) Applicant: Kabushiki Kaisha Toshiba, Minato-ku (JP)

(72) Inventors: Hideaki Fukuzawa, Kawasaki (JP); Yoshihiko Fuji, Kawasaki (JP); Yoshihiro Higashi, Komatsu (JP); Michiko Hara, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/565,755

(22) Filed: Dec. 10, 2014

(65) Prior Publication Data

US 2015/0204739 A1    Jul. 23, 2015

(30) Foreign Application Priority Data

Jan. 20, 2014   (JP) .................................. 2014-008022

(51) Int. Cl.
*G01L 1/12* (2006.01)
*G01L 1/22* (2006.01)
(Continued)

(52) U.S. Cl.
CPC ............. *G01L 1/2287* (2013.01); *G01P 15/105* (2013.01); *G01L 1/12* (2013.01); *G01L 9/16* (2013.01)

(58) Field of Classification Search
CPC ............. G01L 1/12; G01L 9/16; G01L 1/125; H04R 15/00; G01P 15/105
USPC ............................................. 73/779, 862.69
See application file for complete search history.

(56) References Cited

U.S. PATENT DOCUMENTS 6,387,476 B1 *   5/2002  Iwasaki ................... G11B 5/00
                                                      428/212
8,680,633 B1 *   3/2014  Kato ...................... H01L 43/10
                                                      257/421
(Continued)

FOREIGN PATENT DOCUMENTS

JP    2001-160640    6/2001
JP    2011-244938    12/2011
(Continued)

OTHER PUBLICATIONS

Hideaki Fukuzawa et al. "Specular spin-valve films with an FeCo nano-oxide layer by ion-assisted oxidation", Journal of Applied Physics, vol. 91, No. 10, 2002, 7 pages.

*Primary Examiner* — Max Noori
(74) *Attorney, Agent, or Firm* — Oblon, McClelland, Maier & Neustadt, L.L.P

(57) ABSTRACT

According to one embodiment, a pressure sensor includes a base and a sensor unit provided on the base. The sensor unit includes a transducing thin film having a first surface, a first strain sensing element provided on the first surface, and a second strain sensing element provided on the first surface. The first strain sensing element includes a first magnetic layer, a first film having a first oxygen concentration, a second magnetic layer provided between the first magnetic layer and the first film, and a first intermediate layer provided between the first and the second magnetic layer. The second strain sensing element includes a third magnetic layer, a second film having a second oxygen concentration different from the first concentration, a fourth magnetic layer provided between the third magnetic layer and the second film, and a second intermediate layer provided between the third and the fourth magnetic layer.

20 Claims, 14 Drawing Sheets

(51) Int. Cl.
*G01P 15/105* (2006.01)
*G01L 9/16* (2006.01)

(56) References Cited

U.S. PATENT DOCUMENTS

| | | | | |
|---|---|---|---|---|
| 2002/0044396 A1* | 4/2002 | Amano | ............... | B82Y 10/00 |
| | | | | 360/324.2 |
| 2003/0133366 A1* | 7/2003 | Tabata | ............. | G11B 11/10586 |
| | | | | 369/13.47 |
| 2004/0058196 A1* | 3/2004 | Lambeth | ............... | B82Y 10/00 |
| | | | | 428/836.1 |
| 2011/0295128 A1 | 12/2011 | Yuasa et al. | | |
| 2012/0079887 A1 | 4/2012 | Giddings et al. | | |
| 2012/0245477 A1 | 9/2012 | Giddings et al. | | |
| 2013/0070523 A1* | 3/2013 | Saida | ..................... | G11C 11/16 |
| | | | | 365/173 |
| 2013/0076687 A1 | 3/2013 | Giddings et al. | | |
| 2013/0079648 A1 | 3/2013 | Fukuzawa et al. | | |
| 2013/0170669 A1 | 7/2013 | Fukuzawa et al. | | |
| 2013/0255069 A1 | 10/2013 | Higashi et al. | | |
| 2013/0255393 A1* | 10/2013 | Fukuzawa | ................ | G01L 1/12 |
| | | | | 73/779 |
| 2014/0069200 A1 | 3/2014 | Yuasa et al. | | |
| 2014/0090486 A1 | 4/2014 | Fuji et al. | | |
| 2014/0137658 A1 | 5/2014 | Higashi et al. | | |
| 2014/0137668 A1 | 5/2014 | Fukuzawa et al. | | |
| 2015/0082919 A1* | 3/2015 | Higashi | ..................... | G01L 1/12 |
| | | | | 73/862.69 |

FOREIGN PATENT DOCUMENTS

| | | |
|---|---|---|
| JP | 2012-78186 | 4/2012 |
| JP | 2012-176294 | 9/2012 |
| JP | 2012-204479 | 10/2012 |
| JP | 2013-70732 | 4/2013 |
| JP | 2013-72712 | 4/2013 |
| JP | 2013-73374 | 4/2013 |
| JP | 2013-165977 | 8/2013 |
| JP | 2013-205255 | 10/2013 |
| JP | 2013-205403 | 10/2013 |
| JP | 2014-52360 | 3/2014 |
| JP | 2014-74606 | 4/2014 |
| JP | 2014-102171 | 6/2014 |
| JP | 2014-103539 | 6/2014 |
| WO | WO 2011/033981 A1 | 3/2011 |

* cited by examiner

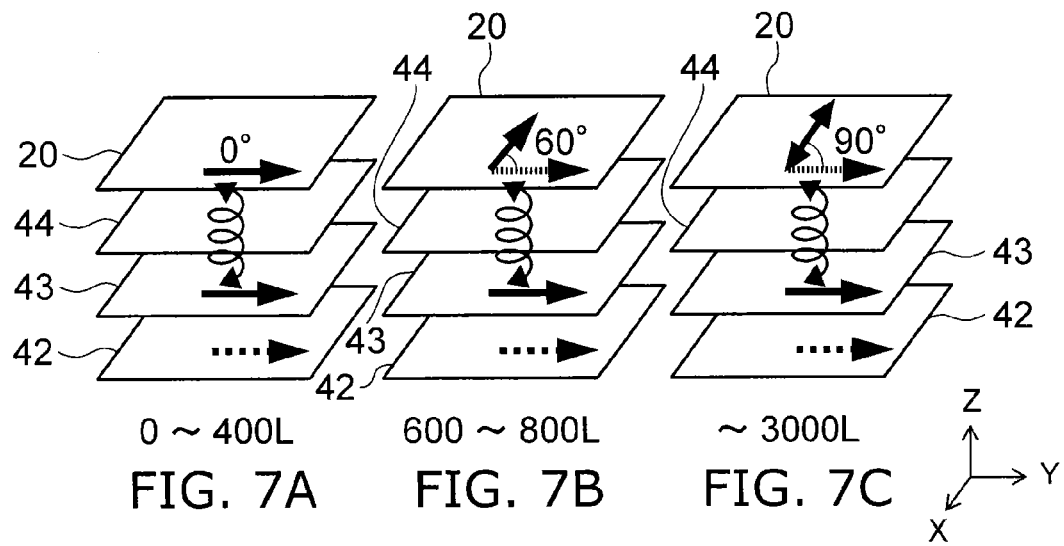
FIG. 7A  0~400L
FIG. 7B  600~800L
FIG. 7C  ~3000L
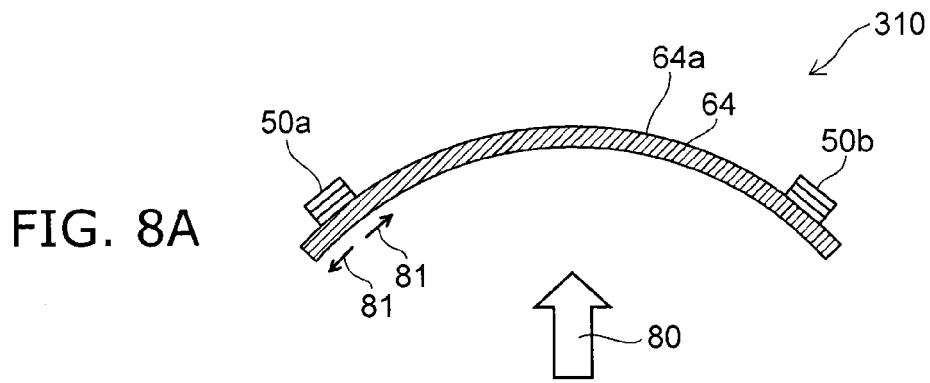
FIG. 8A
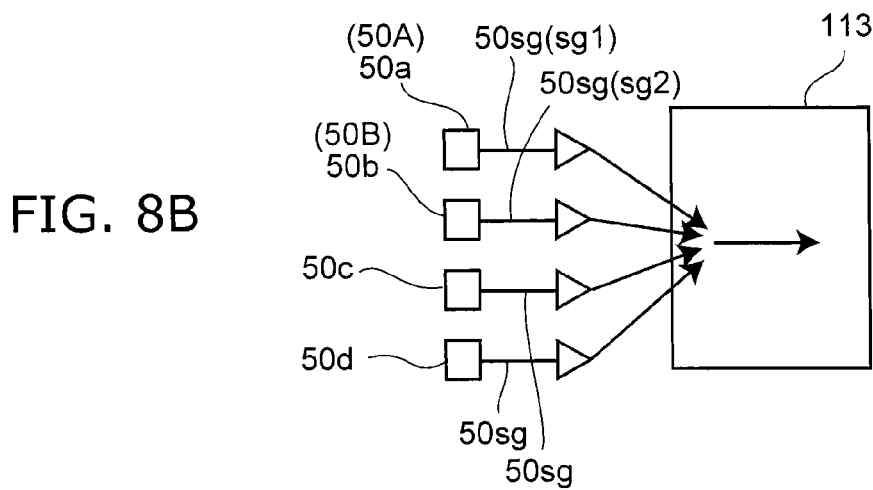
FIG. 8B

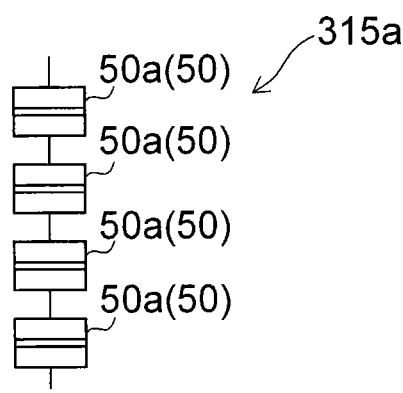
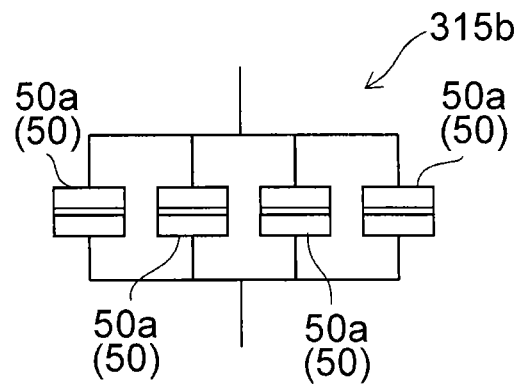
FIG. 15A        FIG. 15B
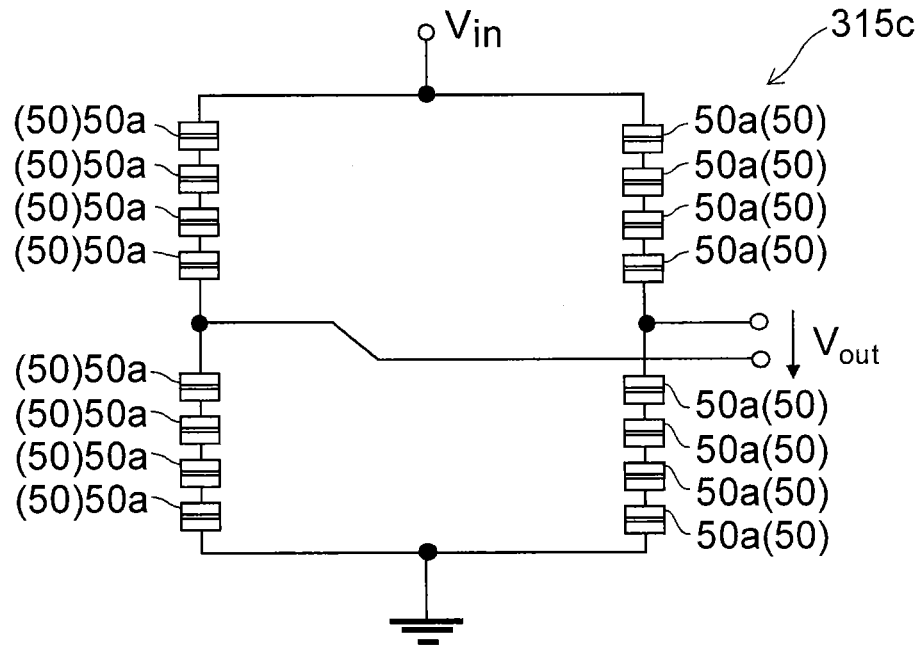
FIG. 15C

PRESSURE SENSOR, ACCELERATION SENSOR, AND METHOD FOR MANUFACTURING PRESSURE SENSOR

CROSS-REFERENCE TO RELATED APPLICATIONS

This application is based upon and claims the benefit of priority from Japanese Patent Application No. 2014-008022, filed on Jan. 20, 2014; the entire contents of which are incorporated herein by reference.

FIELD

Embodiments described herein relate generally to a pressure sensor, an acceleration sensor, and a method for manufacturing pressure sensor.

BACKGROUND

For example, there is a pressure sensor in which multiple strain sensors are provided on a diaphragm. High sensitivity is desirable in the pressure sensor.

BRIEF DESCRIPTION OF THE DRAWINGS

FIG. 7A to FIG. 7C are schematic perspective views illustrating a portion of the pressure sensor according to the first embodiment;

FIG. 8A and FIG. 8B are schematic views illustrating the operations of the pressure sensor according to the first embodiment;

FIG. 15A to FIG. 15C are schematic views illustrating other pressure sensors according to the first embodiment;

DETAILED DESCRIPTION

Figure 1:
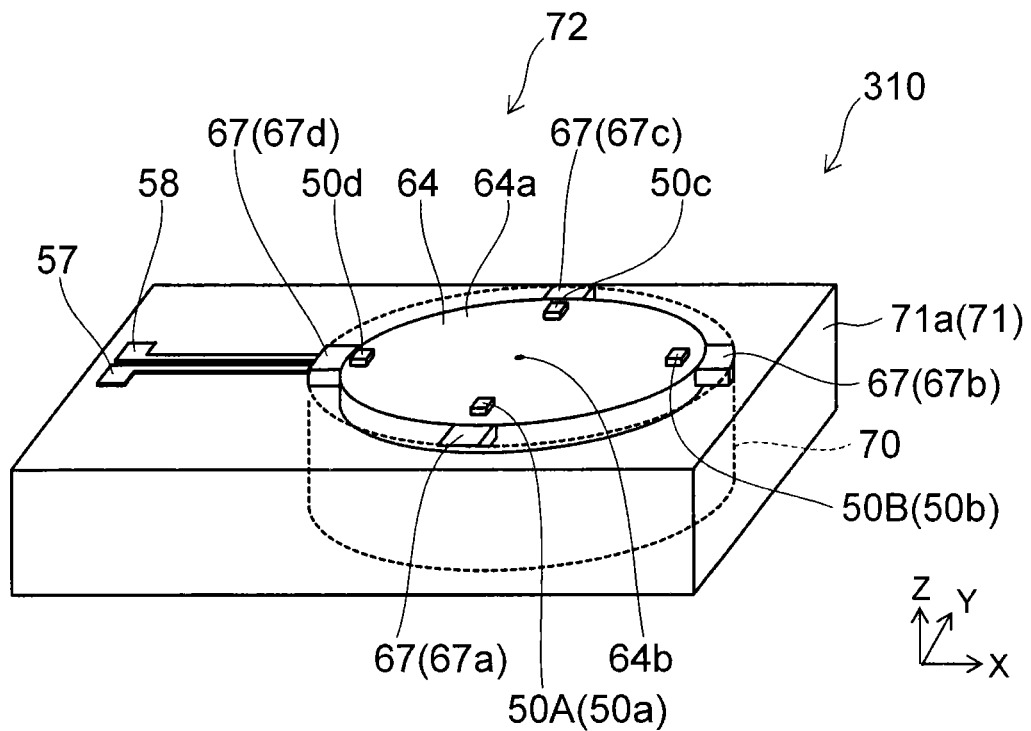
FIG. 1 is a schematic perspective view illustrating a pressure sensor according to a first embodiment.

According to one embodiment, a pressure sensor includes a base and a sensor unit. The sensor unit is provided on the base. The sensor unit includes a transducing thin film, a first strain sensing element, and a second strain sensing element. The transducing thin film has a first surface and is flexible. The first strain sensing element is provided on the first surface. The second strain sensing element is provided on the first surface and is separated from the first strain sensing element. The first strain sensing element includes a first magnetic layer, a first film, a second magnetic layer, and a first intermediate layer. The first magnetic layer has a first magnetization being changeable. The first film includes oxygen at a first oxygen concentration. The second magnetic layer is provided between the first magnetic layer and the first film. The second magnetic layer has a second magnetization being fixed. The first intermediate layer is provided between the first magnetic layer and the second magnetic layer. The second strain sensing element includes a third magnetic layer, a second film, a fourth magnetic layer, and a second intermediate layer. The third magnetic layer has a third magnetization being changeable. The second film has a second oxygen concentration different from the first oxygen concentration. The fourth magnetic layer is provided between the third magnetic layer and the second film. The fourth magnetic layer has a fixed direction of magnetization. The second intermediate layer is provided between the third magnetic layer and the fourth magnetic layer.

According to one embodiment, an acceleration sensor includes a base unit, a plummet, a connector, a first strain sensing element, and a second strain sensing element. The connector connects the plummet and the base unit. The connector is deformable according to a change of a position of the plummet relative to the base unit. The first strain sensing element is provided on a first portion of the connector. The second strain sensing element is provided on a second portion of the connector. The second portion is separated from the first portion. The first strain sensing element includes a first magnetic layer, a first film, a second magnetic layer, and a first intermediate layer. The first magnetic layer has a first magnetization being changeable. The first film includes oxygen at a first oxygen concentration. The second magnetic layer is provided between the first magnetic layer and the first film. The second magnetic layer has a second magnetization being fixed. The first intermediate layer is provided between the first magnetic layer and the second magnetic layer. The second strain sensing element includes a third magnetic layer, a second film, a fourth magnetic layer, and a second intermediate layer. The third magnetic layer has a third magnetization being changeable. The second film has a second oxygen concentration different from the first concentration. The fourth magnetic layer is provided between the third magnetic layer and the second film. The fourth magnetic layer has a fourth magnetization being fixed. The second intermediate layer is provided between the third magnetic layer and the fourth magnetic layer.

According to one embodiment, a method for manufacturing pressure sensor is disclosed. The pressure sensor includes a base and a sensor unit provided on the base. The sensor unit includes a transducing thin film, a first strain sensing element, and a second strain sensing element. The transducing thin film has a first surface and is flexible. The first strain sensing element is provided on the first surface. The second strain sensing element is provided on the first surface and is separated from the first strain sensing element. The first strain sensing element includes a first magnetic layer, a first film, a second magnetic layer, and a first intermediate layer. The first magnetic layer has a first magnetization being changeable. The second magnetic layer is provided between the first magnetic layer and the first film. The second magnetic layer has a second magnetization being fixed. The first intermediate layer is provided between the first magnetic layer and the second magnetic layer. The second strain sensing element includes a third magnetic layer, a second film, a fourth magnetic layer, and a second intermediate layer. The third magnetic layer has a third magnetization being changeable. The fourth magnetic layer is provided between the third magnetic layer and the second film and has a fourth magnetization being fixed. The second intermediate layer is provided between the third magnetic layer and the fourth magnetic layer. The method includes forming a first oxide film used to form the first film.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic perspective view illustrating a pressure sensor according to a first embodiment.

In FIG. 1, the insulating portions are not shown and mainly the conductive portions are shown for easier viewing of the drawing.

Figure 2:
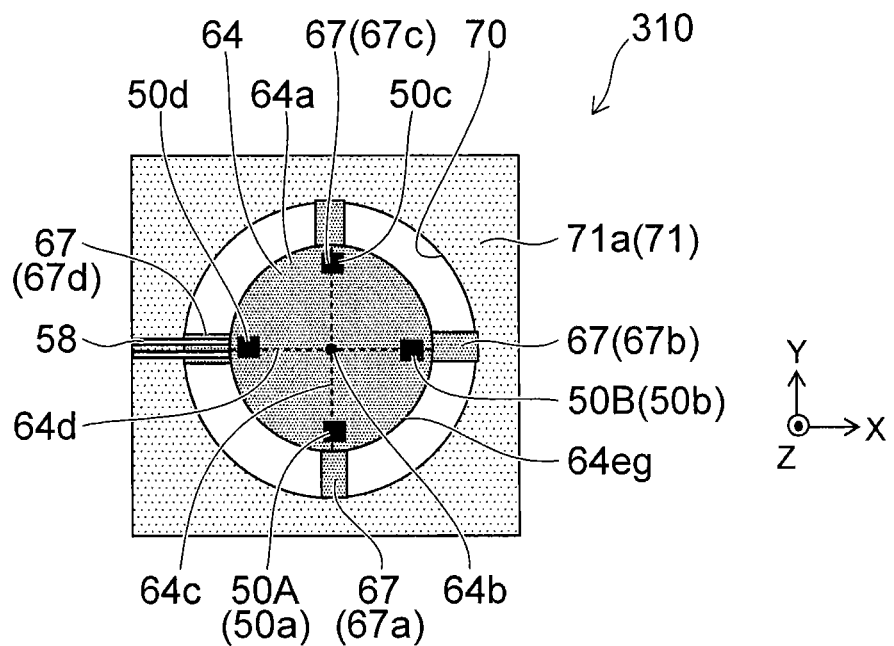
FIG. 2 is a schematic plan view illustrating a portion of the pressure sensor according to the first embodiment.
Figure 3A:
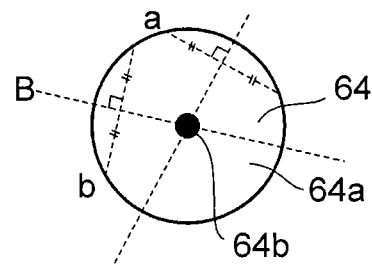
FIG. 3A to FIG. 3D are schematic plan views illustrating portions of the pressure sensor according to the first embodiment.
Figure 3B:
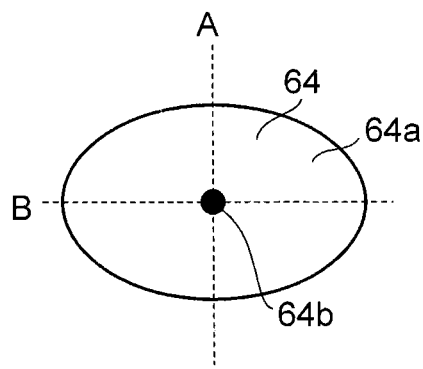
Figure 3C:
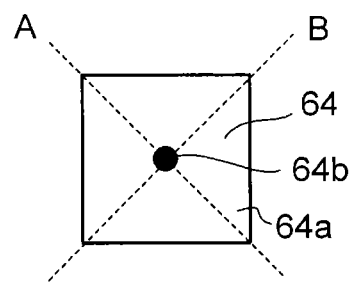
Figure 3D:
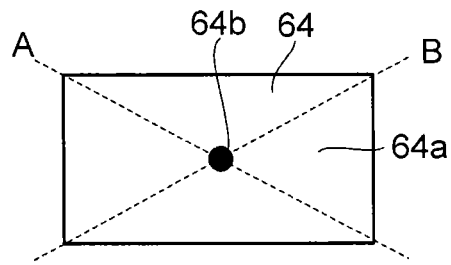

FIG. 2 is a schematic plan view illustrating a portion of the pressure sensor according to the first embodiment.

As shown in FIG. 1, the pressure sensor 310 according to the embodiment includes a base 71a and a sensor unit 72.

The sensor unit 72 is provided on the base 71a. The sensor unit 72 includes a transducing thin film 64, a fixing unit 67, a first strain sensing element 50A, and a second strain sensing element 50B. The transducing thin film 64 has a film surface 64a (a first surface). The transducing thin film 64 is flexible. The transducing thin film 64 deflects when pressure is applied from the outside; and the transducing thin film 64 functions to transduce the strain to the strain sensing elements 50 formed on the transducing thin film 64. The external pressure may be the pressure itself, or pressure due to sound waves, ultrasonic waves, etc. In the case of sound waves, ultrasonic waves, etc., the pressure sensor functions as a microphone.

There are cases where a portion of the thin film used to form the transducing thin film 64 is formed continuously on the outer side of the portion of the thin film that deflects due to the external pressure. In the specification, the section that is called the transducing thin film is surrounded with a fixing edge, has a constant film thickness that is thinner than the fixing edge, and deflects due to the external pressure.

The fixing unit 67 is connected to an edge portion 64eg of the transducing thin film 64. The fixing unit 67 fixes the edge portion 64eg to the base 71a. The first strain sensing element 50A and the second strain sensing element 50B are provided on the film surface 64a. The configurations of the first strain sensing element 50A and the second strain sensing element 50B are described below.

A hollow portion 70 is made in the base 71a. The portion of the base 71a other than the hollow portion 70 corresponds to a non-hollow portion 71. The non-hollow portion 71 is arranged with the hollow portion 70.

The hollow portion 70 is a portion where the material of the non-hollow portion 71 is not provided. The interior of the hollow portion 70 may be a vacuum (a low-pressure state lower than 1 atmosphere); and a gas such as air, an inert gas, etc., may be filled into the hollow portion 70. Also, a liquid may be filled into the hollow portion 70. A deformable substance may be disposed inside the hollow portion 70 so that the transducing thin film 64 can deflect.

The transducing thin film 64 deflects when pressure (including sound, ultrasonic waves, etc.) is applied to the transducing thin film 64 from the outside. Thereby, strain is produced in the strain sensor (the sensor unit 72) disposed on the transducing thin film 64. Thus, the transducing thin film 64 transmits (transduces) the signal of the pressure to the sensor unit 72; and the sensor unit 72 converts the signal of the pressure into a signal of the strain.

The transducing thin film 64 is disposed at the upper portion of the hollow portion 70; and the transducing thin film 64 is fixed to the base 71a by the fixing unit 67.

Here, a plane parallel to the film surface 64a is taken as an X-Y plane. In the case where the film surface 64a is not obtained in a plane, the plane that includes the edge portion 64eg of the film surface 64a is taken as the X-Y plane. A direction perpendicular to the X-Y plane is taken as a Z-axis direction.

As shown in FIG. 1 and FIG. 2, the base 71a, the transducing thin film 64, the fixing unit 67 (the fixing units 67a to 67d), the first strain sensing element 50A, the second strain sensing element 50B, a first interconnect 57, and a second interconnect 58 are provided in the pressure sensor 310. In the example, multiple strain sensing elements 50 (the strain sensing elements 50a to 50d) are provided. The first strain sensing element 50A and the second strain sensing element 50B are any of the multiple strain sensing elements 50. For example, the strain sensing element 50a is used as the first strain sensing element 50A. For example, the strain sensing element 50b is used as the second strain sensing element 50B. Also, the multiple strain sensing elements 50 are disposed at positions that are different from the position of a centroid 64b of the film surface 64a of the transducing thin film 64. For example, each of the multiple strain sensing elements 50 is disposed on a circumference having the centroid 64b as the center. For example, the multiple strain sensing elements 50 are disposed at positions that are equidistant from the position of the centroid 64b. In other words, in the example, the distance between the centroid 64b and the first strain sensing element 50A is substantially the same as the distance between the centroid 64b and the second strain sensing element 50B. For example, the distance between the centroid 64b and the first strain sensing element 50A is not less than 0.8 times and not more than 1.2 times the distance between the centroid 64b and the second strain sensing element 50B. However, in the embodiment, the arrangement of the multiple strain sensing elements 50 is modifiable as appropriate.

In the example, the straight line that passes through the first strain sensing element 50A and the centroid 64b of the film surface 64a is aligned with the Y-axis direction. In the example, the straight line that passes through the second strain sensing element 50B and the centroid 64b is aligned with the X-axis direction. In other words, in the example, the direction from the centroid 64b toward the first strain sensing element 50A intersects the direction from the centroid 64b toward the second strain sensing element 50B. In the example, the direction from the centroid 64b toward the first strain sensing element 50A is perpendicular to the direction from the centroid 64b toward the second strain sensing element 50B.

For example, the straight line that passes through the first strain sensing element 50A and the centroid 64b also passes through the strain sensing element 50c. For example, the straight line that passes through the second strain sensing element 50B and the centroid 64b also passes through the strain sensing element 50d.

FIG. 3A to FIG. 3D are schematic plan views illustrating portions of the pressure sensor according to the first embodiment.

These drawings show configurations of the film surface 64a of the transducing thin film 64.

As shown in FIG. 3A to FIG. 3D, the configuration of the film surface 64a (the deflecting portion) of the transducing thin film 64 is a circle, a flattened circle (including an ellipse), a square, a rectangle, etc. In such a case, the centroid of the film surface 64a is the center of the circle, the center of the ellipse, the center of the square diagonal lines, or the center of the rectangle diagonal lines, respectively.

The transducing thin film 64 is formed of, for example, an insulating layer. Or, the transducing thin film 64 is formed of, for example, a metal material. The transducing thin film 64 includes, for example, silicon oxide, silicon nitride, etc. The thickness of the transducing thin film 64 is, for example, not less than 200 nm and not more than 3 μm is favorable for the thickness to be not less than 300 nm and not more than 1.5 μm. The diameter of the transducing thin film 64 is, for example, not less than 1 μm and not more than 600 μm. It is more favorable for the diameter to be not less than 60 μm and not more than 600 μm. The transducing thin film 64 is, for example, flexible in the Z-axis direction which is perpendicular to the film surface 64a.

In the example, the fixing unit 67 includes fixing units 67a to 67d.

In the example as shown in FIG. 2, the fixing units 67a and 67c are disposed at the intersections between a straight line 64c and the edge portion 64eg of the transducing thin film 64. The straight line 64c passes through the centroid 64b of the film surface 64a of the transducing thin film 64 and is parallel to the Y-axis direction. The fixing unit 67b and the fixing unit 67d are disposed at the intersections between a straight line 64d and the edge portion 64eg of the transducing thin film 64. The straight line 64d passes through the centroid 64b of the film surface 64a of the transducing thin film 64 and is parallel to the X-axis direction. The fixing units 67a to 67d fix the transducing thin film 64 to the non-hollow portion 71 (the base 71a).

The fixing units 67a to 67d include, for example, silicon that is a portion of the substrate material, the same material as the transducing thin film formed on the substrate material, etc. The fixing units 67a to 67d are portions formed to have film thicknesses that are thicker than the transducing thin film 64 so that the fixing units 67a to 67d do not deflect easily even when the external pressure is applied.

One end of each of the strain sensing elements 50a to 50d is connected to the first interconnect 57. One other end of each of the strain sensing elements 50a to 50d is connected to the second interconnect 58.

The first interconnect 57 and the second interconnect 58 extend from the strain sensing element 50 toward the base 71a over the fixing unit 67 or through the interior of the fixing unit 67.

Figure 4:
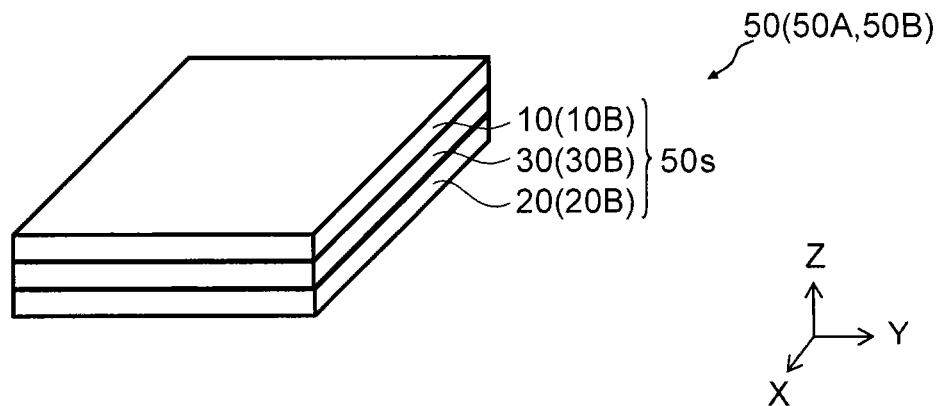
FIG. 4 is a schematic perspective view illustrating a portion of the pressure sensor according to the first embodiment.

FIG. 4 is a schematic perspective view illustrating a portion of the pressure sensor according to the first embodiment.

FIG. 4 shows an example of the configuration of the strain sensing element 50. As shown in FIG. 4, a strain resistance change unit 50s (the strain sensing element 50 and the first strain sensing element 50A) includes, for example, a first magnetic layer 10, a second magnetic layer 20, and an intermediate layer 30 (a first intermediate layer) provided between the first magnetic layer 10 and the second magnetic layer 20. The intermediate layer 30 is a nonmagnetic layer. The configurations of each of the multiple strain sensing elements 50 are similar to those recited above. The direction of the magnetization of the first magnetic layer 10 (a first magnetization) is changeable. The first magnetic layer 10 is a free magnetic layer. The direction of the magnetization of the second magnetic layer 20 (a second magnetization) is substantially fixed. The second magnetic layer 20 is a fixed magnetic layer.

For example, the second strain sensing element 50B includes a third magnetic layer 10B, a fourth magnetic layer 20B, and a nonmagnetic second intermediate layer 30B provided between the third magnetic layer 10B and the fourth magnetic layer 20B. The configuration of the third magnetic layer 10B is similar to the configuration of the first magnetic layer 10. As described below, the orientation of the magnetization of the fourth magnetic layer 20B is different from the orientation of the magnetization of the second magnetic layer 20. Otherwise, the configuration of the fourth magnetic layer 20B is similar to the configuration of the second magnetic layer 20. The configuration of the second intermediate layer 30B is similar to the configuration of the first intermediate layer 30. The direction of the magnetization (a third magnetization) of the third magnetic layer 10B is changeable. The third magnetic layer 10B is a free magnetic layer. The direction of the magnetization of the fourth magnetic layer 20B (a fourth magnetization) is substantially fixed. The fourth magnetic layer 20B is a fixed magnetic layer.

Configurations similar to those of the first magnetic layer 10, the second magnetic layer 20, and the intermediate layer 30 that are described below are applicable to the third magnetic layer 10B, the fourth magnetic layer 20B, and the second intermediate layer 30B. In the strain sensing element 50, an inverse magnetostrictive effect of the ferromagnet and a MR effect arising in the strain resistance change unit 50s are utilized. The MR effect is a phenomenon in which the value of the electrical resistance of a stacked film changes due to the change of the magnetization of a magnet when an external magnetic field is applied to the stacked film including the magnet. The MR effect includes, for example, a GMR (giant magnetoresistance) effect, a TMR (tunneling magnetoresistance) effect, etc. The MR effect arises due to the change of the relative angle of the orientation of the magnetization being read as an electrical resistance change by causing a current to flow in the strain resistance change unit 50s. For example, a tensile stress is applied to the strain resistance change unit 50s based on the stress applied to the strain sensing element 50. When the orientation of the magnetization of the first magnetic layer 10 is different from the direction of the tensile stress applied to the second magnetic layer 20, the MR effect arises due to the inverse magnetostrictive effect. ΔR/R is called the MR ratio, where R is the resistance of the low resistance state, and ΔR is the change amount of the electrical resistance changing due to the MR effect.

Figures 5A, 5B:
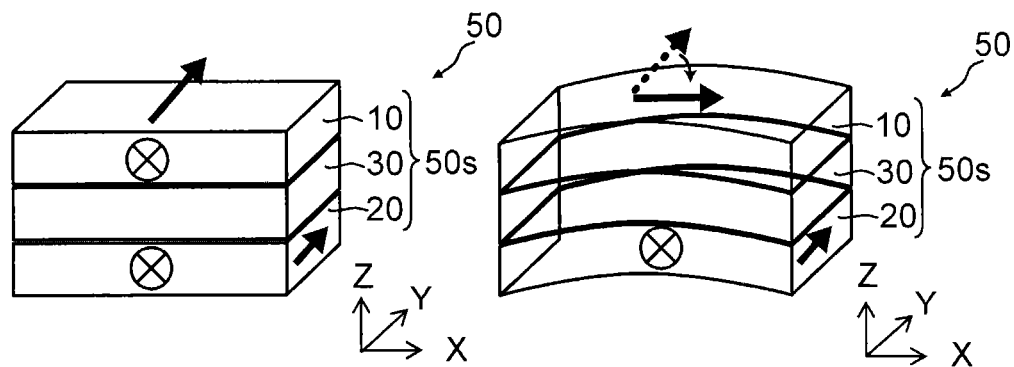
FIG. 5A to FIG. 5C are schematic perspective views illustrating operations of the pressure sensor according to the first embodiment.
Figure 5C:
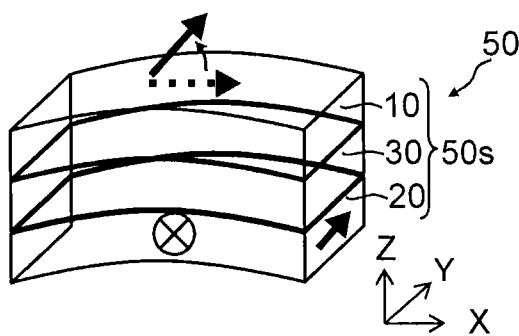

FIG. 5A to FIG. 5C are schematic perspective views illustrating operations of the pressure sensor according to the first embodiment.

These drawings show the state of the strain sensing element 50. These drawings show the relationship between the magnetization direction and the direction of the tensile stress for the strain sensing element 50.

FIG. 5A shows the state in which the tensile stress is not applied. At this time, in the example, the orientation of the magnetization of the second magnetic layer 20 (the fixed magnetic layer) is the same as the orientation of the magnetization of the first magnetic layer 10 (the free magnetic layer).

FIG. 5B shows the state in which the tensile stress is applied. In the example, the tensile stress is applied along the X-axis direction. For example, the tensile stress is applied along the X-axis direction due to deformation of the transducing thin film 64. In other words, the tensile stress is applied in an orthogonal direction to the orientation (in the example, the Y-axis direction) of the magnetization of the second magnetic layer 20 (the fixed magnetic layer) and the first magnetic layer 10 (the free magnetic layer). At this time, the magnetization of the first magnetic layer 10 (the free magnetic layer) rotates to be in the same direction as the direction of the tensile stress. This is called the inverse magnetostrictive effect. At this time, the magnetization of the second magnetic layer 20 (the fixed magnetic layer) is fixed. Therefore, the relative angle between the orientation of the magnetization of the second magnetic layer 20 (the fixed magnetic layer) and the orientation of the magnetization of the first magnetic layer 10 (the free magnetic layer) changes due to the rotation of the magnetization of the first magnetic layer 10 (the free magnetic layer).

In these drawings, the magnetization direction of the second magnetic layer 20 (the fixed magnetic layer) is shown as an example; and the magnetization directions may be different from the directions shown in these drawings.

In the inverse magnetostrictive effect, the easy magnetization axis changes according to the sign of the magnetostriction constant of the ferromagnet. In many materials having large inverse magnetostrictive effects, the magnetostriction constant has a positive sign. In the case where the magnetostriction constant has a positive sign, as described above, the direction in which the tensile stress is applied becomes the easy magnetization axis. In such a case, as recited above, the magnetization of the first magnetic layer 10 (the free magnetic layer) rotates in the direction of the easy magnetization axis.

For example, in the case where the magnetostriction constant of the first magnetic layer 10 (the free magnetic layer) is positive, the magnetization direction of the first magnetic layer 10 (the free magnetic layer) is set to be in a direction different from the direction in which the tensile stress is applied. On the other hand, in the case where the magnetostriction constant is negative, a direction perpendicular to the direction in which the tensile stress is applied becomes the easy magnetization axis.

FIG. 5C shows the state in the case where the magnetostriction constant is negative. In such a case, the magnetization direction of the first magnetic layer 10 (the free magnetic layer) is set to be in a direction that is different from a direction perpendicular to the direction (in the example, the X-axis direction) in which the tensile stress is applied.

In these drawings, the magnetization direction of the second magnetic layer 20 (the fixed magnetic layer) is shown as an example; and the magnetization directions may be different from the directions shown in these drawings.

For example, the electrical resistance of the strain sensing element 50 (the strain resistance change unit 50s) changes due to the MR effect according to the angle between the magnetization of the first magnetic layer 10 and the magnetization of the second magnetic layer 20.

The magnetostriction constant (λs) indicates the magnitude of the shape deformation when the ferromagnetic layer has saturation magnetization in some direction by applying an external magnetic field. For a length L in the state in which there is no external magnetic field, a magnetostriction constant λs is ΔL/L, where the length changes by an amount ΔL when the external magnetic field is applied. Although the change amount changes with the magnitude of the magnetic field, the magnetostriction constant λs is ΔL/L in the state in which a sufficient magnetic field is applied and the magnetization is saturated.

For example, the second magnetic layer 20 includes at least one selected from Fe, Co, and Ni. For example, the second magnetic layer 20 includes Fe, Co, Ni, or an alloy material of these elements. Also, the second magnetic layer 20 may include a material in which an added element is added to the materials recited above, etc. The second magnetic layer 20 may include, for example, a CoFe alloy, a CoFeB alloy, a NiFe alloy, etc. The thickness of the second magnetic layer 20 is, for example, not less than 2 nanometers (nm) and not more than 6 nm.

The intermediate layer 30 may include a metal or an insulator. For example, Cu, Au, Ag, etc., may be used as the metal. In the case of the metal, the thickness of the intermediate layer 30 is, for example, not less than 1 nm and not more than 7 nm. For example, magnesium oxide (MgO, etc.), aluminum oxide ($Al_2O_3$, etc.), titanium oxide (TiO, etc.), and zinc oxide (ZnO, etc.) may be used as the insulator. In the case of the insulator, the thickness of the intermediate layer 30 is, for example, not less than 1 nm and not more than 3 nm.

The first magnetic layer 10 may include, for example, at least one selected from Fe, Co, and Ni or an alloy material including at least one selected from these elements. A material in which an added element is added to the materials recited above may be used.

The first magnetic layer 10 includes a material having a large magnetostriction. Specifically, a material for which the absolute value of the magnetostriction is greater than $10^{-5}$ is used. Thereby, the magnetization changes sensitively to the strain. The first magnetic layer 10 may include a material having a positive magnetostriction or a material having a negative magnetostriction.

The first magnetic layer 10 includes, for example, at least one selected from Fe, Co, and Ni. The first magnetic layer 10 may include, for example, an FeCo alloy, a NiFe alloy, etc. Other than these, the first magnetic layer 10 may include an Fe—Co—Si—B alloy, a Tb-M-Fe alloy with λs>100 ppm (M being Sm, Eu, Gd, Dy, Ho, and Er), a Tb-M1-Fe-M2 alloy (M1 being Sm, Eu, Gd, Dy, Ho, and Er and M2 being Ti, Cr, Mn, Co, Cu, Nb, Mo, W, and Ta), an Fe-M3-M4-B alloy (M3 being Ti, Cr, Mn, Co, Cu, Nb, Mo, W, and Ta and M4 being Ce, Pr, Nd, Sm, Tb, Dy, and Er), Ni, Al—Fe, ferrite ($Fe_3O_4$, $(FeCo)_3O_4$, etc.), and the like. The thickness of the first magnetic layer 10 is, for example, 2 nm or more.

The first magnetic layer 10 may have a two-layer structure. In such a case, the first magnetic layer 10 may include a layer of an FeCo alloy or one selected from the following layers stacked with a layer of an FeCo alloy. A layer of a material selected from an Fe—Co—Si—B alloy, a Tb-M-Fe alloy with λs>100 ppm (M being Sm, Eu, Gd, Dy, Ho, and Er), a Tb-M1-Fe-M2 alloy (M1 being Sm, Eu, Gd, Dy, Ho, and Er and M2 being Ti, Cr, Mn, Co, Cu, Nb, Mo, W, and Ta), an Fe-M3-M4-B alloy (M3 being Ti, Cr, Mn, Co, Cu, Nb, Mo, W, and Ta and M4 being Ce, Pr, Nd, Sm, Tb, Dy, and Er), Ni, Al—Fe, ferrite ($Fe_3O_4$, $(FeCo)_3O_4$, etc.), and the like may be stacked with a layer of the FeCo alloy.

For example, in the case where the intermediate layer 30 is a metal, a GMR effect arises. In the case where the intermediate layer 30 is an insulator, a TMR effect arises. For example, in the strain sensing element 50, a CPP (Current Perpendicular to Plane)—GMR effect may be used in which a current is caused to flow along, for example, the stacking direction of the strain resistance change unit 50s.

As the intermediate layer 30, a CCP (Current-Confined-Path) spacer layer may be used in which metal current paths having widths (e.g., diameters) not less than about 1 nm and not more than about 5 nm are multiply made in a portion of the insulating layer to pierce the insulating layer in the film thickness direction. In such a case as well, the CCP effect is used.

Thus, in the embodiment, the inverse magnetostrictive phenomenon is used in the strain sensing element 50. Thereby, highly-sensitive sensing is possible. In the case where the inverse magnetostrictive effect is used, for example, the magnetization direction of the first magnetic layer 10 changes due to the strain applied from the outside. The relative angle of the magnetization of the two magnetic layers changes due to the strain (the application/non-application of the strain, the degree of the strain, etc.) applied from the outside. The strain sensing element 50 functions as a pressure sensor because the electrical resistance changes due to the strain applied from the outside.

The spin of the magnetic layer is used in the strain sensing element 50. An extremely small size of the strain sensing element 50 is sufficient to provide the necessary surface area. Considering, for example, a square, it is sufficient for the size of the strain sensing element 50 to be 10 nm by 10 nm to 20 nm by 20 nm or more.

The surface area of the strain sensing element 50 is set to be sufficiently less than the surface area of the transducing thin film 64 that deflects. Here, as described above, the transducing thin film is the section that is surrounded with the fixing edge, has a constant film thickness thinner than the fixing edge, and deflects due to the external pressure. Specifically, the surface area of the strain sensing element 50 is not more than ⅕ of the surface area of the transducing thin film 64 in the substrate plane. Generally, the size of the transducing thin film 64 is not less than about 60 µm and not more than about 600 µm as described above. In the case where the diameter of the transducing thin film 64 is small, i.e., about 60 µm, the length of one side of the strain sensing element 50 is, for example, not more than 12 µm. In the case where the diameter of the transducing thin film is 600 µm, the length of one side of the strain sensing element 50 is 120 µm or less. These values are, for example, the upper limits of the size of the strain sensing element 50.

Compared to these values of the upper limits, the size in which the length of one side is not less than 10 nm and not more than 20 nm as recited above is extremely small. Therefore, considering the patterning precision of the element, etc., it is unnecessary to excessively shrink the strain sensing element 50. Therefore, it is realistically favorable for the size of one side of the strain sensing element 50 to be set to be, for example, not less than about 0.5 µm and not more than about 20 µm. In the case where the element size is extremely small, the bias control of the strain sensing element 50 may be difficult because the magnitude of the demagnetizing field generated in the strain sensing element 50 is large. Because problems of the demagnetizing field no longer occur as the element size increases, the handling is easy from an engineering perspective. From such a perspective, as described above, it is favorable for the size to be not less than 0.5 µm and not more than 20 µm.

For example, the length along the X-axis direction of the strain sensing element 50 is not less than 20 nm and not more than 10 µm. It is favorable for the length along the X-axis direction of the strain sensing element 50 to be not less than 200 nm and not more than 5 µm.

For example, the length along the Y-axis direction (a direction perpendicular to the X-axis direction and parallel to the X-Y plane) of the strain sensing element 50 is not less than 20 nm and not more than 10 µm. It is favorable for the length along the Y-axis direction of the strain sensing element 50 to be not less than 200 nm and not more than 5 µm.

For example, the length along the Z-axis direction (a direction perpendicular to the X-Y plane) of the strain sensing element 50 is not less than 20 nm and not more than 100 nm.

The length along the X-axis direction of the strain sensing element 50 may be the same as or different from the length along the Y-axis direction of the strain sensing element 50. Shape magnetic anisotropy occurs in the case where the length along the X-axis direction of the strain sensing element 50 is different from the length along the Y-axis direction of the strain sensing element 50. Thereby, effects can be obtained similarly to the effects obtained using a hard bias layer.

The orientation of the current that flows through the strain sensing element 50 may be the direction from the first magnetic layer 10 toward the second magnetic layer 20 or may be the direction from the second magnetic layer 20 toward the first magnetic layer 10.

Figure 6A:
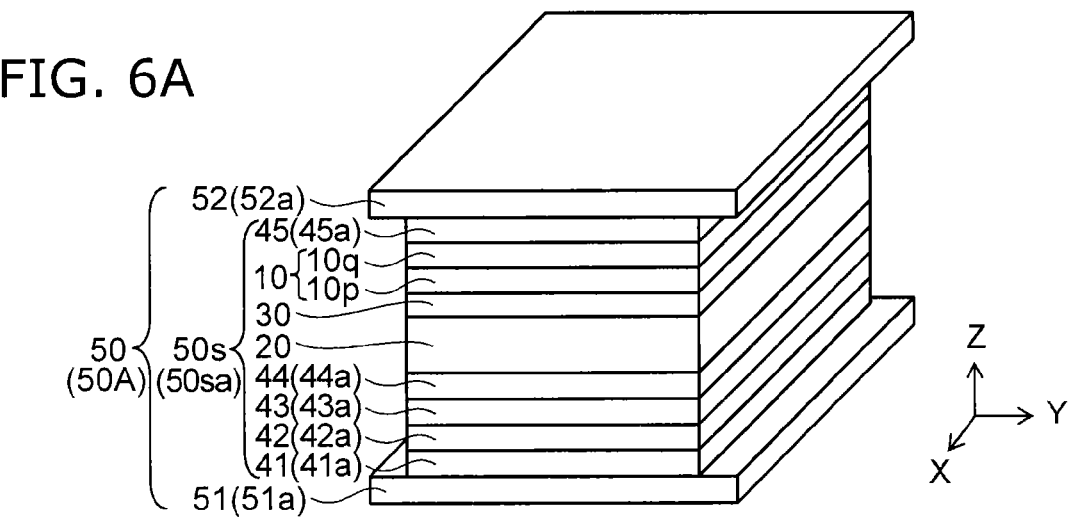
FIG. 6A to FIG. 6C are schematic perspective views illustrating a portion of the pressure sensor according to the first embodiment.
Figure 6B:
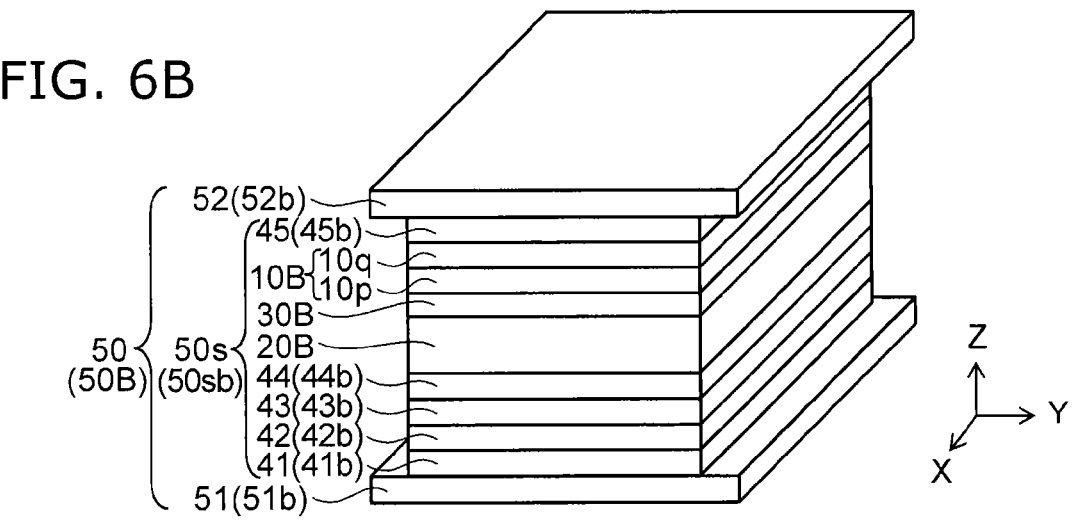
Figure 6C:
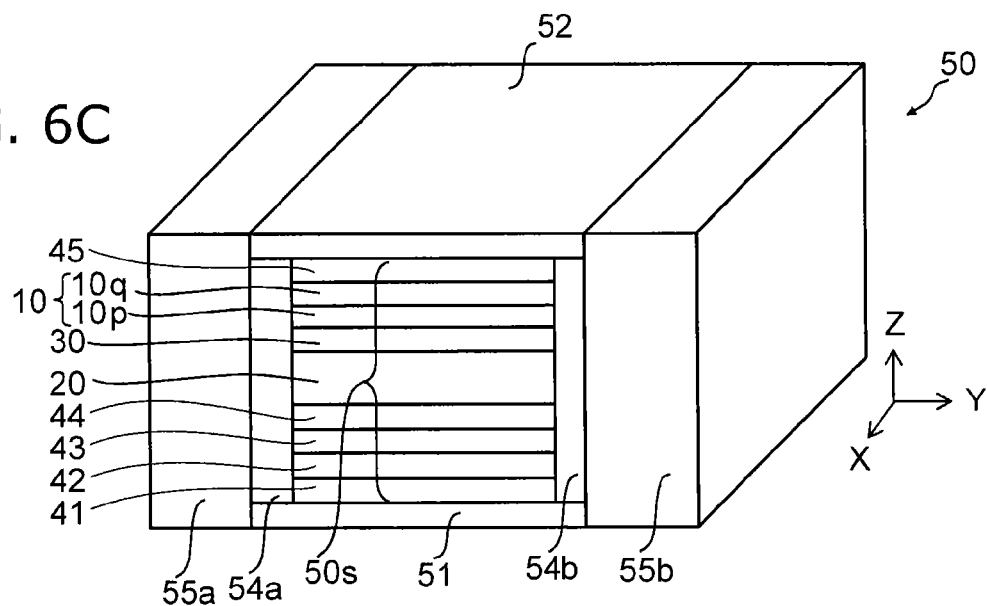

FIG. 6A to FIG. 6C are schematic perspective views illustrating a portion of the pressure sensor according to the first embodiment.

As shown in FIG. 6A, the strain sensing element 50 (the first strain sensing element 50A) includes, for example, a first electrode 51 (a first electrode 51a) and a second electrode 52 (a second electrode 52a). The strain resistance change unit 50s (the strain resistance change unit 50sa) is provided between the first electrode 51 and the second electrode 52.

In the example, the first magnetic layer 10 is provided between the first electrode 51 and the second electrode 52 in the strain resistance change unit 50s. The second magnetic layer 20 is provided between the first electrode 51 and the first magnetic layer 10. The intermediate layer 30 (the first intermediate layer) is provided between the first magnetic layer 10 and the second magnetic layer 20.

A buffer layer 41 (a first buffer layer 41a) is provided between the first electrode 51 and the second magnetic layer 20. An antiferromagnetic layer 42 (a first antiferromagnetic layer 42a) is provided between the buffer layer 41 and the second magnetic layer 20. A ferromagnetic layer 43 (a first ferromagnetic layer 43a) is provided between the antiferromagnetic layer 42 and the second magnetic layer 20. A film 44 (a first film 44a) is provided between the ferromagnetic layer 43 and the second magnetic layer 20. A capping layer 45 (a first capping layer 45a) is provided between the first magnetic layer 10 and the second electrode 52.

In other words, the first strain sensing element 50A is provided on the first surface and includes the first magnetic layer 10, the second magnetic layer 20, the first intermediate layer 30, the first film 44a, the first ferromagnetic layer 43a, and the first antiferromagnetic layer 42a. The second magnetic layer 20 is provided between the first magnetic layer 10 and the first film 44a. The first film 44a is provided between the second magnetic layer 20 and the first ferromagnetic layer 43a. The first ferromagnetic layer 43a is provided between the second magnetic layer 20 and the first antiferromagnetic layer 42a.

As shown in FIG. 6B, the strain sensing element 50 (the second strain sensing element 50B) includes, for example, the first electrode 51 (the first electrode 51b) and the second electrode 52 (the second electrode 52b). The strain resistance change unit 50s (the strain resistance change unit 50sb) is provided between the first electrode 51 and the second electrode 52.

In the example, the third magnetic layer 10B is provided between the first electrode 51 and the second electrode 52 in the strain resistance change unit 50s. The fourth magnetic layer 20B is provided between the first electrode 51 and the third magnetic layer 10B. The second intermediate layer 30B is provided between the third magnetic layer 10B and the fourth magnetic layer 20B. The buffer layer 41 (the second buffer layer 41b) is provided between the first electrode 51 and the fourth magnetic layer 20B. The antiferromagnetic layer 42 (the second antiferromagnetic layer 42b) is provided between the buffer layer 41 and the fourth magnetic layer 20B. The ferromagnetic layer 43 (the second ferromagnetic layer 43b) is provided between the antiferromagnetic layer 42 and the fourth magnetic layer 20B. The film 44 (the second film 44b) is provided between the ferromagnetic layer 43 and the fourth magnetic layer 20B. The capping layer 45 (a second capping layer 45b) is provided between the first magnetic layer 10 and the second electrode 52.

In other words, the second strain sensing element 50B is provided on the first surface and is separated from the first strain sensing element 50A. The second strain sensing element 50B includes the third magnetic layer 10B, the fourth magnetic layer 20B, the second intermediate layer 30B, the second film 44b, the second ferromagnetic layer 43b, and the second antiferromagnetic layer 42b. The fourth magnetic layer 20B is provided between the third magnetic layer 10B and the second film 44b. The second film 44b is provided between the fourth magnetic layer 20B and the second ferromagnetic layer 43b. The second ferromagnetic layer 43b is provided between the fourth magnetic layer 20B and the second antiferromagnetic layer 42b.

There are cases where the buffer layer 41 also is used as a seed layer. The thickness of the buffer layer 41 is, for example, not less than 1 nm and not more than 10 nm. The buffer layer 41 includes, for example, an amorphous layer including at least one selected from Ta and Ti, or a layer including at least one selected from Ru and NiFe. A stacked film of these layers may be used. The layer that includes the at least one selected from Ru and NiFe is used to form, for example, a seed layer for promoting the crystal orientation.

The thickness of the antiferromagnetic layer 42 is, for example, not less than 5 nm and not more than 10 nm. The thickness of the ferromagnetic layer 43 is, for example, not less than 2 nm and not more than 6 nm. The thickness of the second magnetic layer 20 is, for example, not less than 2 nm and not more than 5 nm. The thickness of the intermediate layer 30 is, for example, not less than 1 nm and not more than 3 nm. The thickness of the first magnetic layer 10 is, for example, not less than 2 nm and not more than 5 nm. The thickness of the capping layer 45 is, for example, not less than 1 nm and not more than 5 nm.

The first magnetic layer 10 includes, for example, a magnetic stacked film. The first magnetic layer 10 includes a magnetic stacked film 10p (having, for example, a thickness not less than 1 nm and not more than 3 nm and including, for example, CoFe, an alloy including CoFe, etc.) for increasing the MR ratio and a highly magnetostrictive film 10q (having, for example, a thickness of not less than 1 nm and not more than 5 nm) provided between the magnetic stacked film 10p and the capping layer 45.

The first electrode 51 and the second electrode 52 may include, for example, Au, Cu, Ta, Al, etc., which are nonmagnets. By using a soft magnet material as the first electrode 51 and the second electrode 52, the magnetic noise from the outside that effects the strain resistance change unit 50s can be reduced. For example, permalloy (NiFe alloy) and silicon steel (FeSi alloy) may be used as the soft magnet material. The strain sensing element 50 is covered with an insulator such as aluminum oxide (e.g., $Al_2O_3$), silicon oxide (e.g., $SiO_2$), etc., so that a leakage current does not flow into the surroundings.

The antiferromagnetic layer 42 (the first antiferromagnetic layer 42a and the second antiferromagnetic layer 42b) includes, for example, PtMn or IrMn. The thickness of the antiferromagnetic layer 42 is, for example, not less than 3 nm and not more than 20 nm.

The ferromagnetic layer 43 (the first ferromagnetic layer 43a and the second ferromagnetic layer 43b) includes, for example, CoFe. The thickness of the ferromagnetic layer 43 is, for example, not less than 1 nm and not more than 4 nm. The ferromagnetic layer 43 is, for example, a fixed magnetic layer. The direction of the magnetization of the antiferromagnetic layer 42 is, for example, aligned with the direction of the magnetization of the ferromagnetic layer 43.

The first film 44a and the second film 44b are, for example, NOLs (Nano-Oxide Layers). The thicknesses of the first film 44a and the second film 44b are, for example, not less than 1 nm and not more than 4 nm.

FIG. 6C shows another configuration of the portion of the pressure sensor according to the first embodiment.

As shown in FIG. 6C, the strain sensing element 50 may include bias layers 55a and 55b (hard bias layers). The bias layers 55a and 55b are provided to oppose the strain resistance change unit 50s.

The bias layers 55a and 55b are arranged with the second magnetic layer 20. The strain resistance change unit 50s is disposed between the bias layers 55a and 55b. An insulating layer 54a is provided between the bias layer 55a and the strain resistance change unit 50s. An insulating layer 54b is provided between the bias layer 55b and the strain resistance change unit 50s.

The bias layers 55a and 55b apply a bias magnetic field to the first magnetic layer 10. Thereby, it is possible for the magnetization direction of the first magnetic layer 10 to be biased to the appropriate position; and it is possible to have a single domain.

The sizes (in the example, the length along the Y-axis direction) of the bias layers 55a and 55b are, for example, not less than 100 nm and not more than 10 μm.

The sizes (in the example, the length along the Y-axis direction) of the insulating layers 54a and 54b are, for example, not less than 1 nm and not more than 5 nm.

FIG. 7A to FIG. 7C are schematic perspective views illustrating a portion of the pressure sensor according to the first embodiment.

FIG. 7A to FIG. 7C show the relationship between the oxidizing intensity of the film 44 (the first film 44a) and the orientation of the magnetization of the second magnetic layer 20.

The direction of the magnetization of the second magnetic layer 20 changes due to the oxidizing intensity of the first film 44a (the NOL). The direction of the magnetization of the fourth magnetic layer 20B changes due to the oxidizing intensity of the second film 44b (the NOL).

FIG. 7A shows the case where the oxidizing intensity of the first film 44a (the NOL) is more than 0 L (langmuirs) but not more than 400 L.

As shown in FIG. 7A, the direction of the magnetization of the second magnetic layer 20 is aligned with the direction of the magnetization of the ferromagnetic layer 43. For example, the angle between the direction of the magnetization of the second magnetic layer 20 and the direction of the magnetization of the ferromagnetic layer 43 is 10 degrees or less.

1 L is a unit relating to the oxidizing intensity. 1 L corresponds to the amount formed by exposing for 1 second in an atmosphere having a partial pressure of oxygen of $1 \times 10^{-6}$ Torr.

FIG. 7B shows the case where the oxidizing intensity of the first film 44a (the NOL) is not less than 600 L and not more than 800 L.

As shown in FIG. 7B, the angle between the direction of the magnetization of the second magnetic layer 20 and the direction of the magnetization of the ferromagnetic layer 43 is, for example, about 60 degrees (e.g., not less than 50 degrees and not more than 70 degrees).

FIG. 7C shows the case where the oxidizing intensity of the first film 44a (the NOL) is more than 800 L (but not more than 3000 L).

As shown in FIG. 7C, the angle between the direction of the magnetization of the second magnetic layer 20 and the direction of the magnetization of the ferromagnetic layer 43 is, for example, about 90 degrees (e.g., not less than 80 degrees and not more than 100 degrees).

The direction of the magnetization of the fourth magnetic layer 20B of the second strain sensing element 50B similarly changes due to the oxidizing intensity. Thus, the direction of the magnetization of the second magnetic layer 20 and the direction of the magnetization of the fourth magnetic layer 20B can be changed by changing the oxidizing intensity of the film 44.

For example, the oxygen concentration of the first film 44a of the first strain sensing element 50A is a first concentration (a first oxygen concentration). For example, the oxygen concentration of the second film 44b of the second strain sensing element 50B is a second concentration (a second oxygen concentration). The second concentration is different from the first concentration. The embodiment also includes the case where oxygen substantially is not included in one selected from the first film 44a and the second film 44b. For example, the second film 44b may not include oxygen. That is, the second oxygen concentration may be 0.

For example, the first film 44a includes oxygen and a first metallic element having a first valence. The second film 44b includes oxygen and the first metallic element having a second valence that is different from the first valence. The first metallic element is, for example, at least one selected from iron (Fe), chrome (Cr), nickel (Ni), and manganese (Mn).

For example, the first film 44a includes one selected from FeO, $Fe_3O_4$, $\alpha$-$Fe_2O_3$, and $\gamma$-$Fe_2O_3$; and the second film 44b includes one selected from FeO, $Fe_3O_4$, $\alpha$-$Fe_2O_3$, and $\gamma$-$Fe_2O_3$ that is different from the one recited above.

For example, the first film 44a includes one selected from CrO, $Cr_2O_3$, $CrO_2$, $Cr_2O_5$, $CrO_3$, and $CrO_5$; and the second film 44b includes one selected from CrO, $Cr_2O_3$, $CrO_2$, $Cr_2O_5$, $CrO_3$, and $CrO_5$ that is different from the one recited above.

For example, the first film 44a includes one selected from MnO and $MnO_2$. The second film 44b includes one selected from MnO and $MnO_2$ that is different from the one recited above.

In the embodiment, the oxidizing intensity of the first film 44a included in the first strain sensing element 50A is different from the oxidizing intensity of the second film 44b included in the second strain sensing element 50B. Thereby, the direction of the magnetization of the second magnetic layer 20 and the direction of the magnetization of the fourth magnetic layer 20B can be different from each other.

In the embodiment, as described below, one of the oxidization that forms the first film 44a or the oxidization that forms the second film 44b may be omitted. Thereby, the direction of the magnetization of the second magnetic layer 20 and the direction of the magnetization of the fourth magnetic layer 20B can be different from each other.

For example, the oxygen concentration of the first film 44a is not less than 20 atomic percent (atomic %) and not more than 70 atomic %; and the oxygen concentration of the second film 44b is not less than 0 atomic % and not more than 20 atomic %. The values of the oxygen concentrations of the layers may be interchanged.

An example of operations of the embodiment will now be described.

FIG. 8A and FIG. 8B are schematic views illustrating the operations of the pressure sensor according to the first embodiment.

FIG. 8A is a schematic cross-sectional view when FIG. 2 is cut by the straight line 64d. FIG. 8B is a schematic view showing the operations of the pressure sensors.

In the pressure sensor 310 according to the embodiment as shown in FIG. 8A, the transducing thin film 64 receives stress 80 from a medium such as air, etc., and deflects. For example, stress 81 (e.g., tensile stress) is applied to the transducing thin film 64 so that the transducing thin film 64 deflects so that the film surface 64a has a convex configuration. At this time, the stress 81 is applied to the strain sensing element 50 provided on the film surface 64a of the transducing thin film 64; and strain occurs in the strain sensing element 50. Thereby, in the strain sensing element 50, the electrical resistance between one end and one other end of the strain sensing element 50 changes according to the change of the amount of strain due to the inverse magnetostrictive effect. In the case where the transducing thin film 64 deflects so that the film surface 64a has a concave configuration, a compressive stress is applied to the transducing thin film 64.

As shown in FIG. 8B, a signal 50sg that corresponds to the stress recited above can be obtained from each of the multiple strain sensing elements 50. For example, a first signal sg1 is obtained from the first strain sensing element 50A. A second signal sg2 is obtained from the second strain sensing element 50B. The multiple signals 50sg are processed by a processing circuit 113. For example, addition is performed for the multiple signals 50sg obtained from the strain sensing elements 50.

At this time, not only are the signals simply added, but adding that is weighted by the position, etc., is performed. Thereby, it is possible to obtain a pressure signal that is favorable for the application.

For example, the stress sensor according to the embodiment is applicable to an acoustic microphone, an ultrasonic microphone, or the like that acquires sound waves. In such a case, even when the signal obtained from each of the strain sensing elements 50 is faint, it is possible to obtain a signal that is suited to the amplification of a subsequent stage by adding the signals from the multiple strain sensing elements 50.

Figure 9A:
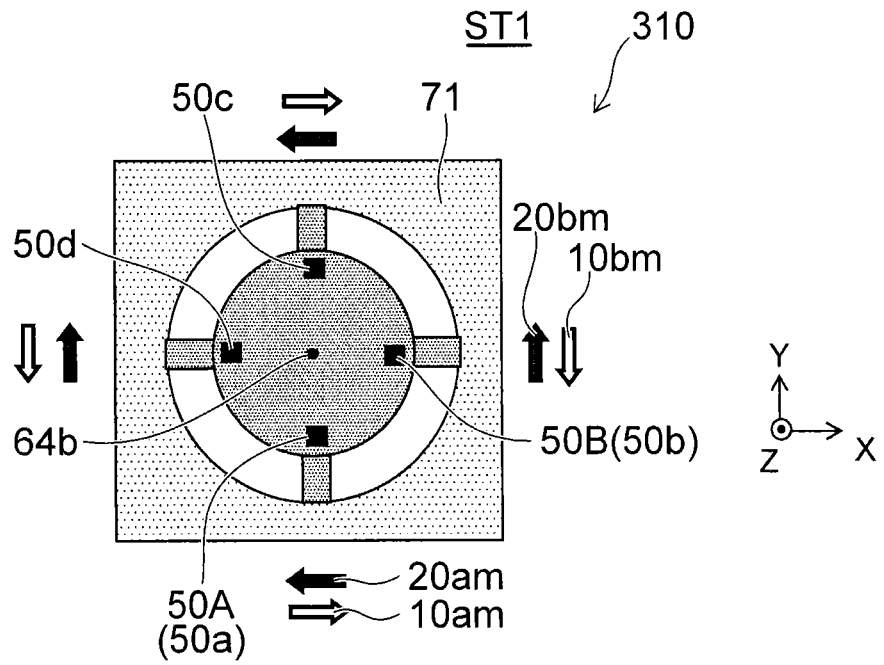
FIG. 9A and FIG. 9B are schematic views illustrating operations of the pressure sensor according to the first embodiment.
Figure 9B:
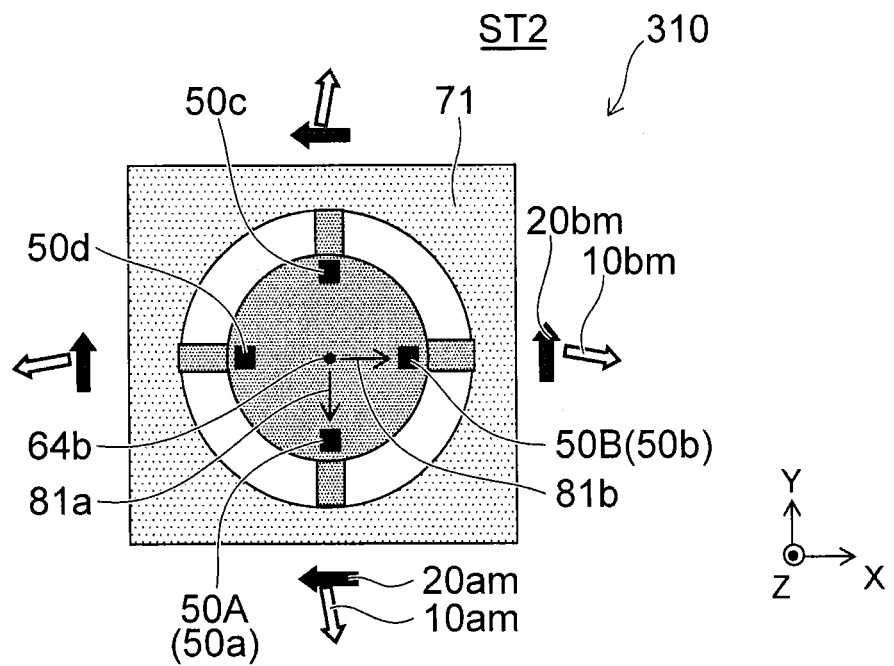

FIG. 9A and FIG. 9B are schematic views illustrating operations of the pressure sensor according to the first embodiment.

FIG. 9A shows a first state ST1. FIG. 9B shows a second state ST2.

The first state ST1 corresponds to, for example, the state in which pressure from the outside is not applied to the transducing thin film 64. The second state ST2 corresponds to, for example, the state in which the pressure in the Z-axis direction is applied from the outside to the transducing thin film 64. In the second state ST2, the transducing thin film 64 deflects so that the film surface 64*a* has a convex configuration.

As shown in FIG. 9A, the direction (a second layer magnetization direction 20*am*) of the magnetization of the second magnetic layer 20 of the first strain sensing element 50A intersects (e.g., is orthogonal to) the direction from the centroid 64*b* toward the first strain sensing element 50A. For example, the second layer magnetization direction 20*am* is aligned with the X-axis direction.

The direction (a fourth layer magnetization direction 20*bm*) of the magnetization of the fourth magnetic layer 20B of the second strain sensing element 50B intersects (e.g., is orthogonal to) the direction from the centroid 64*b* toward the second strain sensing element 50B. For example, the fourth layer magnetization direction 20*bm* is aligned with the Y-axis direction.

The second layer magnetization direction 20*am* and the fourth layer magnetization direction 20*bm* intersect each other. For example, the second layer magnetization direction 20*am* and the fourth layer magnetization direction 20*bm* are orthogonal to each other. The oxidizing intensity of the first film 44*a* of the first strain sensing element 50A and the oxidizing intensity of the second film 44*b* of the second strain sensing element 50B are adjusted. In other words, the oxygen concentration of the first film 44*a* and the oxygen concentration of the second film 44*b* are adjusted. Thereby, the second layer magnetization direction 20*am* and the fourth layer magnetization direction 20*bm* can be set to directions such as those recited above.

The direction (a first layer magnetization direction 10*am*) of the magnetization of the first magnetic layer 10 of the first strain sensing element 50A is aligned with the second layer magnetization direction 20*am*. In the example, the angle between the first layer magnetization direction 10*am* and the second layer magnetization direction 20*am* is about 180 degrees.

The direction (a third layer magnetization direction 10*bm*) of the magnetization of the third magnetic layer 10B of the second strain sensing element 50B is aligned with the fourth layer magnetization direction 20*bm*. In the example, the angle between the third layer magnetization direction 10*bm* and the fourth layer magnetization direction 20*bm* is about 180 degrees.

The second layer magnetization direction 20*am* and the fourth layer magnetization direction 20*bm* are substantially fixed.

As shown in FIG. 9B, the second layer magnetization direction 20*am* in the second state ST2 substantially does not change from the second layer magnetization direction 20*am* in the first state ST1. The fourth layer magnetization direction 20*bm* in the second state ST2 substantially does not change from the fourth layer magnetization direction 20*bm* in the first state ST1.

In the second state ST2, a tensile stress 81 is applied to the first strain sensing element 50A and the second strain sensing element 50B. The direction of the stress 81 of the first strain sensing element 50A is different from the direction of the stress 81 of the second strain sensing element 50B.

The direction (a first stress direction 81*a*) of the stress 81 of the first strain sensing element 50A is, for example, aligned with the direction from the centroid 64*b* toward the first strain sensing element 50A. The first stress direction 81*a* intersects (e.g., is orthogonal to) the second layer magnetization direction 20*am*.

The first layer magnetization direction 10*am* in the second state ST2 is changed from the first layer magnetization direction 10*am* in the first state ST1 by the stress 81. The first layer magnetization direction 10*am* in the second state ST2 changes to a direction aligned with the first stress direction 81*a*. Thereby, the electrical resistance of the first strain sensing element 50A changes between the first state ST1 and the second state ST2.

The direction (a second stress direction 81*b*) of the stress 81 of the second strain sensing element 50B is aligned with, for example, the direction from the centroid 64*b* toward the second strain sensing element 50B. The second stress direction 81*b* intersects (e.g., is orthogonal to) the fourth layer magnetization direction 20*bm*.

The third layer magnetization direction 10*bm* in the second state ST2 is changed from the third layer magnetization direction 10*bm* in the first state ST1 by the stress 81. The third layer magnetization direction 10*bm* in the second state ST2 is changed to a direction aligned with the second stress direction 81*b*. Thereby, the electrical resistance of the second strain sensing element 50B changes between the first state ST1 and the second state ST2.

Similarly, in the multiple strain sensing elements 50 (e.g., the strain sensing elements 50*c* and 50*d*) as well, the electrical resistance changes between the first state ST1 and the second state ST2. The signals from each of the multiple strain sensing elements 50 can be obtained. For example, highly-sensitive sensing of pressure can be realized by adding the multiple signals.

In the embodiment, it is easy to reduce the size of the strain sensing elements 50. Thereby, the multiple strain sensing elements 50 can be provided on the transducing thin film 64. The number of strain sensing elements 50 is increased. Thereby, the SN ratio improves. A highly-sensitive pressure sensor can be provided.

Figure 10:
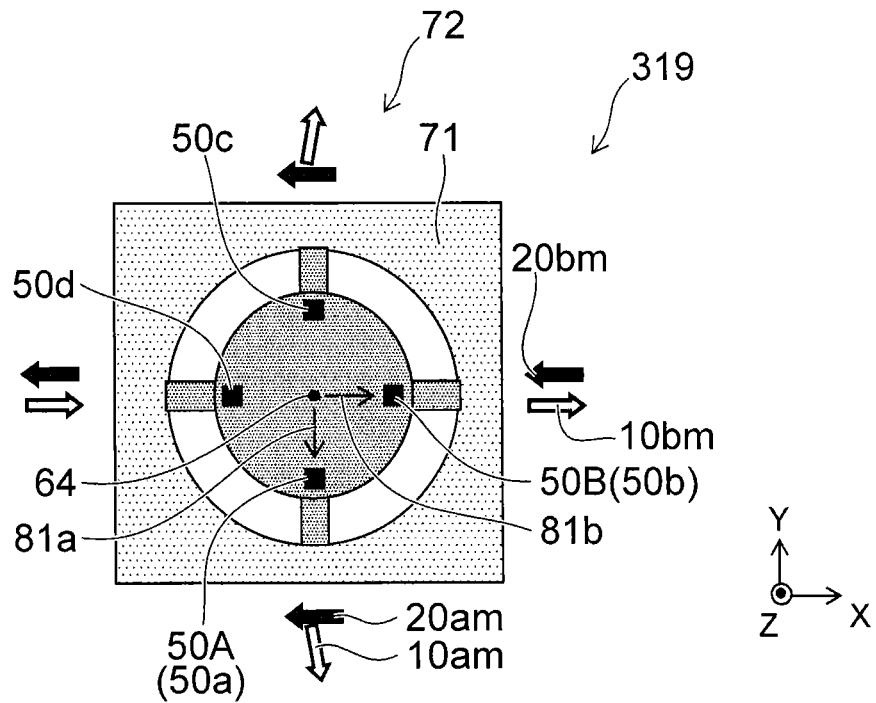
FIG. 10 is a schematic view illustrating a pressure sensor of a reference example.

FIG. 10 is a schematic view illustrating a pressure sensor of a reference example.

The base 71*a* and the sensor unit 72 are provided in the pressure sensor 319 of the reference example shown in FIG. 10 as well. The sensor unit 72 includes the transducing thin film 64, the fixing unit 67, the first strain sensing element 50A, and the second strain sensing element 50B.

In the pressure sensor 319, the oxygen concentration of the second film 44*b* of the second strain sensing element 50B and the oxygen concentration of the first film 44*a* of the first strain sensing element 50A are the same. Otherwise, the configuration described in regard to the pressure sensor 310 is applicable to the pressure sensor 319.

FIG. 10 corresponds to the state in which pressure in the Z-axis direction is applied from the outside to the transducing thin film 64. The transducing thin film 64 deflects so that the film surface 64*a* has a convex configuration.

In the pressure sensor 319, the oxygen concentration of the first film 44*a* and the oxygen concentration of the second film 44*b* are the same. Therefore, the second layer magnetization direction 20*am* and the fourth layer magnetization direction 20*bm* are the same. In the example, the fourth layer magnetization direction 20*bm* is aligned with the X-axis direction.

For example, the first layer magnetization direction 10*am* is aligned with the second layer magnetization direction 20*am* in the state in which the pressure from the outside is not applied to the transducing thin film 64. The third layer magnetization direction 10*bm* is aligned with the fourth layer magnetization direction 20*bm*. The first layer magnetization direction 10*am* and the third layer magnetization direction 10*bm* are aligned with the X-axis direction.

In the case where the pressure is applied from the outside as shown in FIG. 10, the first layer magnetization direction 10*am* changes to be aligned with the first stress direction 81*a*. For example, the first layer magnetization direction 10*am* changes to be aligned with the Y-axis direction. Thereby, the electrical resistance of the first strain sensing element 50A changes.

On the other hand, the second stress direction 81*b* and the third layer magnetization direction 10*bm* are, for example, parallel. Thereby, even when the pressure is applied from the outside, the change of the third layer magnetization direction 10*bm* is small (e.g., there is no change). The change of the electrical resistance of the second strain sensing element 50B is small (e.g., there is no change). There are cases where a signal that corresponds to the pressure is not obtained from the second strain sensing element 50B.

Conversely, in the pressure sensor according to the embodiment, the oxygen concentration of the first film 44*a* and the oxygen concentration of the second film 44*b* are different from each other. By adjusting the oxygen concentration, the direction of the magnetization of the fixed magnetic layer (the second magnetic layer 20) in each of the multiple strain sensing elements intersects (e.g., is orthogonal to) the direction of the stress 81. Thereby, a signal that corresponds to the pressure can be obtained with high sensitivity in each of the multiple strain sensing elements. A highly-sensitive pressure sensor can be provided.

Figure 11:
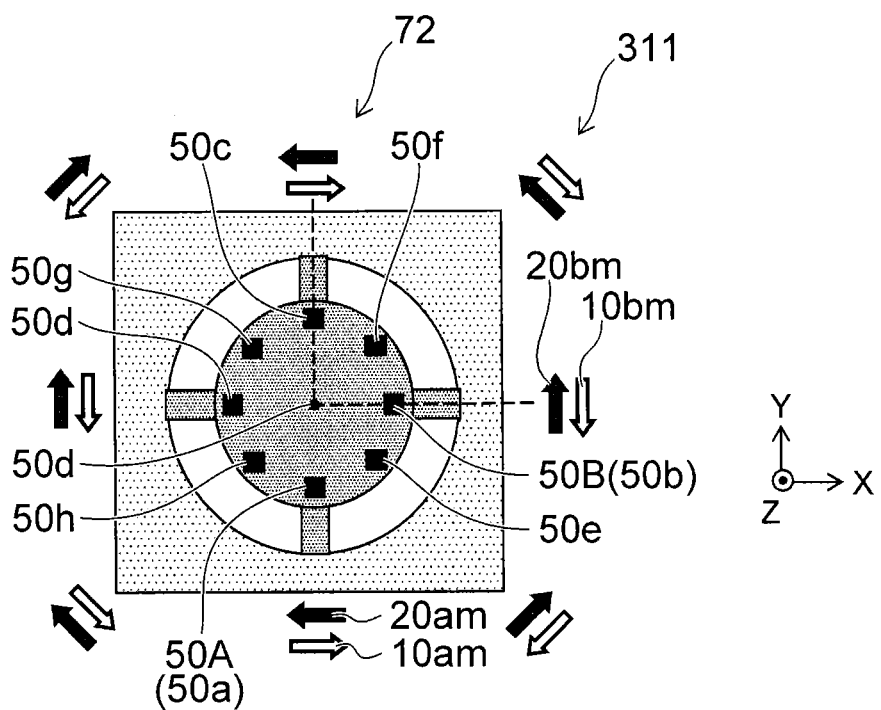
FIG. 11 is a schematic view illustrating another pressure sensor according to the first embodiment.

FIG. 11 is a schematic view illustrating another pressure sensor according to the first embodiment.

The base 71*a* and the sensor unit 72 are provided in the pressure sensor 311 as well. The sensor unit 72 includes the transducing thin film 64, the fixing unit 67, and the multiple strain sensing elements 50. The configuration described in regard to the pressure sensor 310 is applicable to the pressure sensor 311.

In the embodiment, the number of multiple strain sensing elements 50 is arbitrary (two or more). In the pressure sensor 311 as shown in FIG. 11, the number of multiple strain sensing elements 50 that are provided on the transducing thin film 64 is eight. The SN ratio of the pressure sensor can be improved by increasing the strain sensing elements 50. Each of the multiple strain sensing elements 50 is disposed, for example, on a circumference having the centroid 64*b* as a center. For example, the multiple strain sensing elements 50 are disposed at positions that are equidistant from the position of the centroid 64*b*.

The oxygen concentration of the film 44 is adjusted in each of the multiple strain sensing elements 50. Thereby, the direction of the magnetization of the second magnetic layer 20 intersects (e.g., is orthogonal to) the direction from the centroid 64*b* toward the strain sensing elements 50. Thereby, the signal can be obtained with high sensitivity for each of the multiple strain sensing elements 50.

Figure 12:
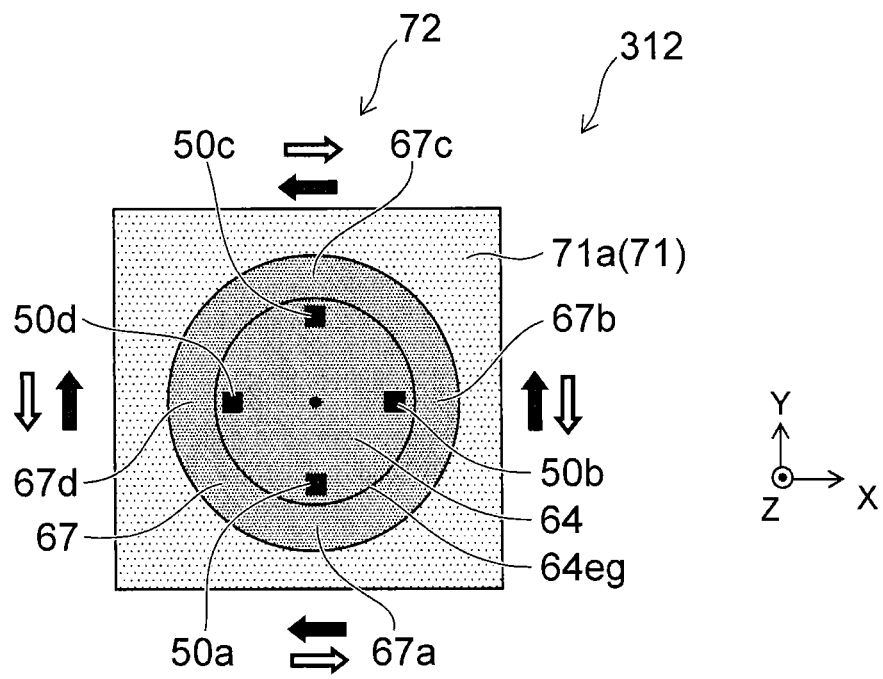
FIG. 12 is a schematic view illustrating another pressure sensor according to the first embodiment.

FIG. 12 is a schematic view illustrating another pressure sensor according to the first embodiment.

The base 71*a* and the sensor unit 72 are provided in the pressure sensor 312 as well. The sensor unit 72 includes the transducing thin film 64, the fixing unit 67, and the multiple strain sensing elements 50. The configuration described in regard to the pressure sensor 310 is applicable to the pressure sensor 312.

In the example as shown in FIG. 12, the fixing unit 67 is continuous. For example, the fixing unit 67*a* is continuous with the fixing unit 67*b*. The configuration of the fixing unit 67 is, for example, a ring configuration; and the fixing unit 67 fixes the transducing thin film 64 along the edge portion 64*eg* of the transducing thin film 64. The edge portion 64*eg* of the transducing thin film 64 is fixed continuously.

For example, the degree of the deformation of the transducing thin film 64 with respect to the pressure that is applied is high and the sensing sensitivity is high in the case where the fixing unit 67*a* and the fixing unit 67*b* are separated. On the other hand, the mechanical strength of the fixing unit 67 is high in the case where the fixing unit 67 is continuous.

Also, from another perspective, when sensing sound pressure of a low frequency region, the sound waves may travel around to the backside of the transducing thin film 64 through a hole such as that provided in the fixing unit 67 as shown in FIG. 1 or FIG. 2 (where the fixing unit 67 is not continuous). The sound pressure may not be sensed correctly. The decrease of the sensor sensitivity due to this phenomenon is called the roll-off phenomenon. In the case where the object is to perform sensing of the low frequency domain of audible sound, such a hole in the fixing unit 67 is undesirable. Therefore, it is desirable not to have a hole in the fixing unit as in FIG. 12 in a microphone that senses sound waves of audible sound.

Although the fixing units 67*a* to 67*d* and the base 71*a* are shown as separate regions in FIG. 12, the fixing units 67*a* to 67*d* and the base 71*a* may be a single body. In such a case, the base 71*a* itself is used to form the fixing units 67*a* to 67*d* (the fixing units 67*a* to 67*d* are included in the base 71*a*).

The fixing unit 67 is designed according to the thickness of the fixing unit 67, the necessary sensing sensitivity, and the perspective of reliability.

Figure 13:
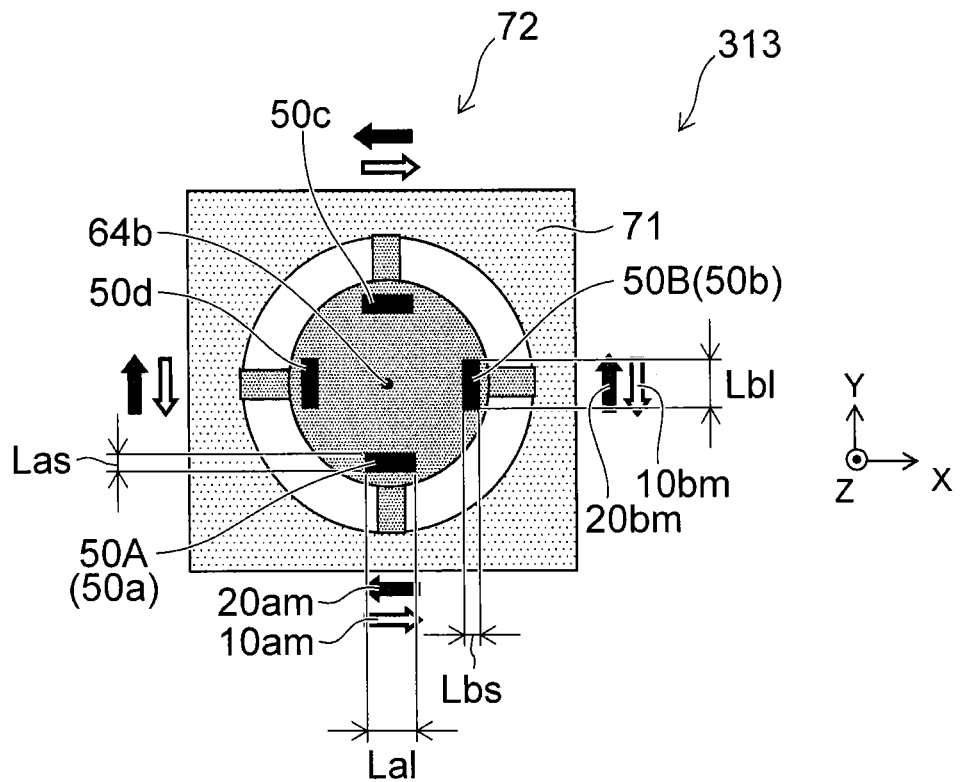
FIG. 13 is a schematic view illustrating another pressure sensor according to the first embodiment.

FIG. 13 is a schematic view illustrating another pressure sensor according to the first embodiment.

The base 71*a* and the sensor unit 72 are provided in the pressure sensor 313 as well. The sensor unit 72 includes the transducing thin film 64, the fixing unit 67, and the multiple strain sensing elements 50. The configuration described in regard to the pressure sensor 310 is applicable to the pressure sensor 313.

As shown in FIG. 13, shape anisotropy may be provided in each of the strain sensing elements 50. For example, the length (a first length Las) of the first strain sensing element 50A along the direction (a first direction) from the centroid 64*b* toward the first strain sensing element 50A is different from the length (a second length La1) of the first strain sensing element 50A along a direction (a second direction) perpendicular to the first direction. In the example, the second length La1 is longer than the first length Las. Thus, shape anisotropy is provided in the first strain sensing element 50A.

For example, the length (a third length Lbs) of the second strain sensing element 50B along the direction from the centroid 64*b* toward the second strain sensing element 50B is different from the length (a fourth length Lb1) of the second strain sensing element 50B along a direction perpendicular to the direction from the centroid 64*b* toward the second strain sensing element 50B. In the example, the fourth length Lb1 is longer than the third length Lbs.

For example, the direction of the shape anisotropy of the first strain sensing element 50A is set to be different from the direction of the shape anisotropy of the second strain sensing element 50B. Thereby, the second layer magnetization direction 20am and the fourth layer magnetization direction 20bm can be set to be different from each other. The sensitivity of each of the strain sensing elements 50 can be increased.

According to the embodiment, by adjusting the oxygen concentration of the film 44, the sensitivity of each of the multiple strain sensing elements 50 can be increased; and a highly-sensitive pressure sensor can be provided.

Figure 14:
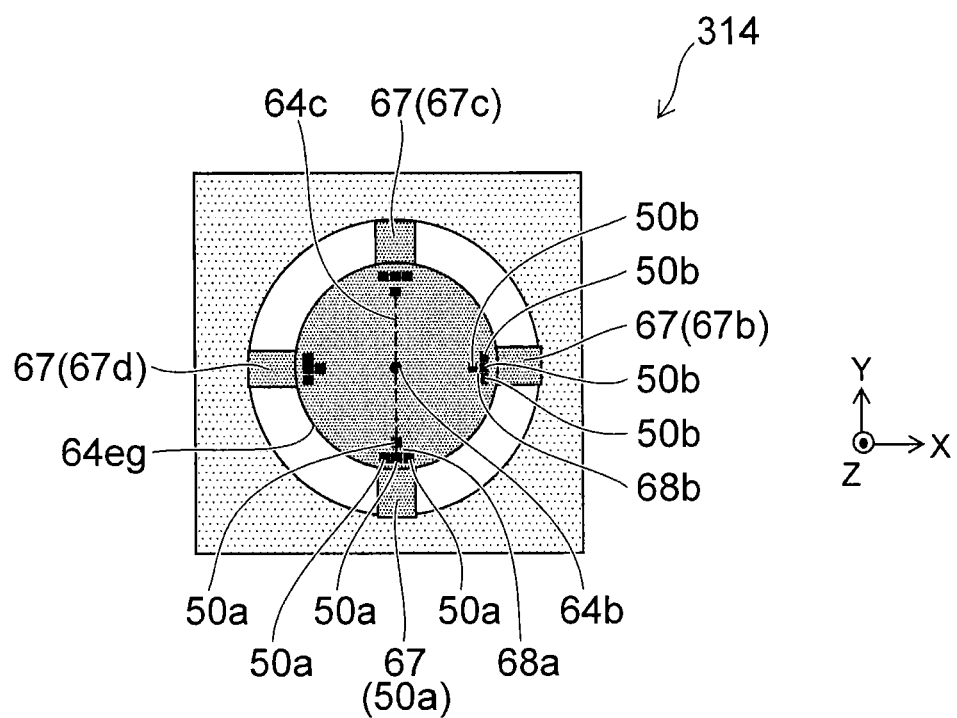
FIG. 14 is a schematic view illustrating another pressure sensor according to the first embodiment.

FIG. 14 is a schematic view illustrating another pressure sensor according to the first embodiment.

In the pressure sensor 314 according to the embodiment as shown in FIG. 14, multiple strain sensing elements 50a are provided between the fixing unit 67a and the centroid 64b (a first portion 68a). In the example, a portion of the multiple strain sensing elements 50a are arranged along a direction that is aligned with the edge portion 64eg. Further, another portion of the strain sensing elements 50a are arranged along the direction of a straight line having a radial configuration from the centroid 64b toward the edge portion 64eg (e.g., on the straight line 64c).

In the example, multiple strain sensing elements 50b are provided between the fixing unit 67b and the centroid 64b (a second portion 68b). In the example, a portion of the multiple strain sensing elements 50b are arranged along a direction that is aligned with the edge portion 64eg. Further, another portion of the multiple strain sensing elements 50b is arranged along the direction of a straight line having a radial configuration from the centroid 64b toward the edge portion 64eg (e.g., on the straight line 64d).

Strain occurs in the first portion 68a and the second portion 68b when the stress 81 is applied. The sensitivity is increased further by providing multiple strain sensing elements 50a inside the first portion 68a where strain occurs in the same direction. The sensitivity is increased further by providing multiple strain sensing elements 50b inside the second portion 68b where strain occurs in the same direction. The strain sensing elements 50 that are multiply provided may be connected to each other in series or in parallel.

FIG. 15A to FIG. 15C are schematic views illustrating other pressure sensors according to the first embodiment.

These drawings show examples of connection states of the multiple strain sensing elements 50 (the strain sensing elements 50a).

As shown in FIG. 15A, the multiple strain sensing elements 50 are electrically connected in series in the pressure sensor 315a according to the embodiment. For example, the multiple strain sensing elements 50a are provided on the first portion 68a. At least two of the multiple strain sensing elements 50a are electrically connected in series.

The electrical signal that is obtained when N strain sensing elements 50 are connected in series is N times that of the case where the number of strain sensing elements 50 is 1. On the other hand, the thermal noise and the Schottky noise are $N^{1/2}$ times. In other words, the SN ratio (signal-noise ratio (SNR)) is $N^{1/2}$ times. The SN ratio can be improved without increasing the size of the transducing thin film 64 by increasing the number N of the strain sensing elements 50 connected in series.

For example, the change (e.g., the polarity) of the electrical resistance R with respect to the stress 81 in the first portion 68a where the strain sensing elements 50a are provided is similar for each of the multiple strain sensing elements 50a. Therefore, it is possible to add the signals of the multiple strain sensing elements 50a.

The bias voltage that is applied to one strain sensing element 50 is, for example, not less than 50 millivolts (mV) and not more than 150 mV. In the case where N strain sensing elements 50 are connected in series, the bias voltage is not less than 50 mV×N and not more than 150 mV×N. For example, in the case where the number N of the strain sensing elements 50 connected in series is 25, the bias voltage is not less than 1 V and not more than 3.75 V.

It is practically favorable when the value of the bias voltage is not less than 1 V because the design is easy for the electronic circuit that processes the electrical signals obtained from the strain sensing elements 50. For example, multiple strain sensing elements 50 are provided for which electrical signals having the same polarity are obtained when the pressure is applied. As recited above, the SN ratio can be improved by connecting such strain sensing elements in series.

A bias voltage (a voltage across the terminals) that exceeds 10 V is undesirable for the electronic circuit that processes the electrical signals obtained from the strain sensing elements 50. In the embodiment, the bias voltage and the number N of the strain sensing elements 50 connected in series are set to provide an appropriate voltage range.

For example, it is favorable for the voltage to be not less than 1 V and not more than 10 V when electrically connecting the multiple strain sensing elements 50 in series. For example, the voltage that is applied between the terminals at two ends (between the terminal at one end and the terminal at one other end) of the multiple strain sensing elements 50 (the strain sensing elements 50a) electrically connected in series to be not less than 1 V and not more than 10 V.

In the case where the bias voltage that is applied to one strain sensing element 50 is 50 mV, it is favorable for the number N of the strain sensing elements 50 connected in series to be not less than 20 and not more than 200 to generate such a voltage. In the case where the bias voltage that is applied to one strain sensing element 50 is 150 mV, it is favorable for the number N of the strain sensing elements 50 (the strain sensing elements 50a) connected in series to be not less than 7 and not more than 66.

As shown in FIG. 15B, multiple strain sensing elements 50 (strain sensing elements 50a) are electrically connected in parallel in the pressure sensor 315b according to the embodiment. In the embodiment, at least a portion of the multiple strain sensing elements 50 may be electrically connected in parallel.

As shown in FIG. 15C, multiple strain sensing elements 50 (strain sensing elements 50a) are connected so that the multiple strain sensing elements 50 form a Wheatstone bridge circuit in the pressure sensor 314c according to the embodiment. Thereby, for example, temperature compensation of the sensing characteristics can be performed.

Second Embodiment

Figure 16:
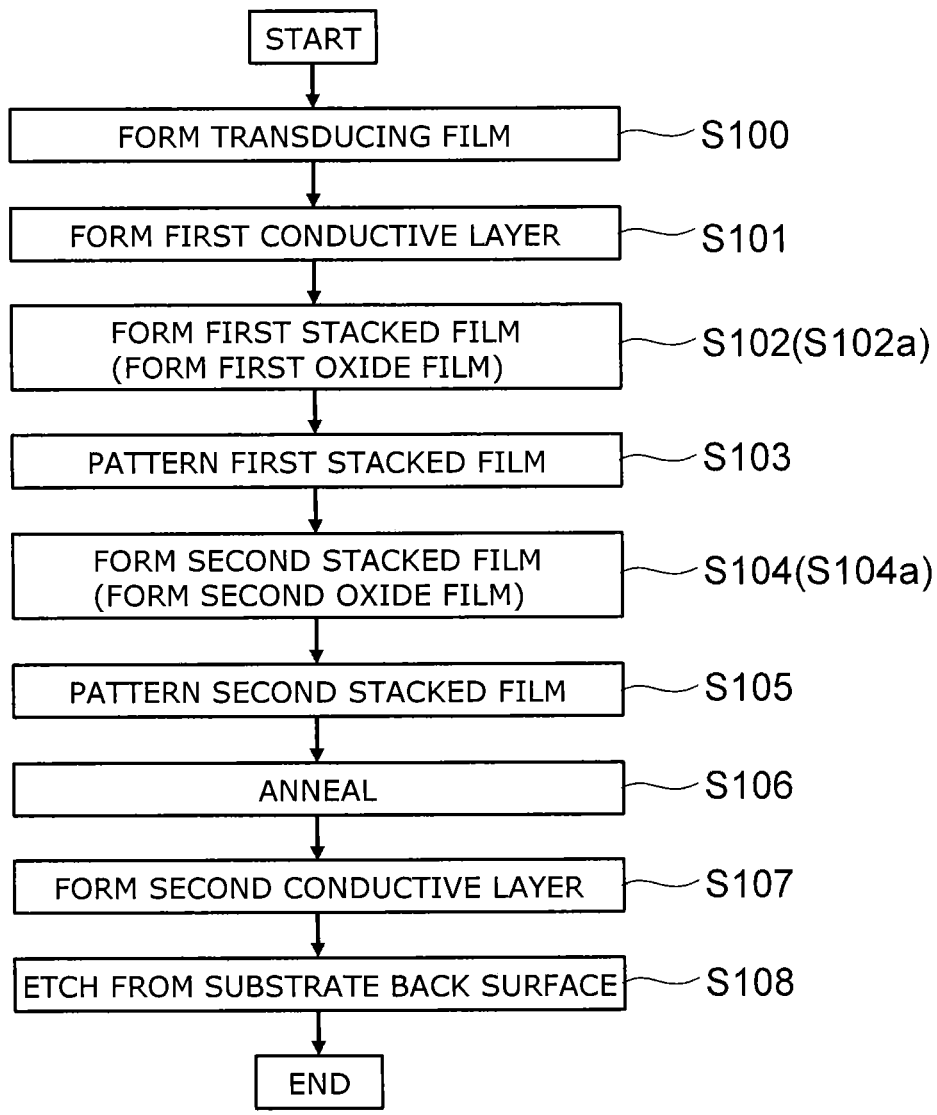
FIG. 16 is a schematic view illustrating a method for manufacturing a pressure sensor according to a second embodiment.

FIG. 16 is a schematic view illustrating a method for manufacturing a pressure sensor according to a second embodiment.

FIG. 17A to FIG. 17E are schematic views illustrating the method for manufacturing the pressure sensor according to the second embodiment.

FIG. 16 and FIGS. 17A to 17E show the method for manufacturing the pressure sensor 310.

As shown in FIG. 16, the method for manufacturing the pressure sensor 310 includes a process of forming the transducing thin film 64 (step S100), a process of forming a first conductive layer 57a (step S101), a process of forming a first stacked film 50AS (step S102), a process of patterning the first stacked film 50AS (step S103), a process of forming a second stacked film 50BS (step S104), a process of patterning the second stacked film 50BS (step S105), an annealing process (step S106), a process of forming a second conductive layer 57b (step S107), and a process of etching from the substrate back surface (step S108).

Figure 17A:
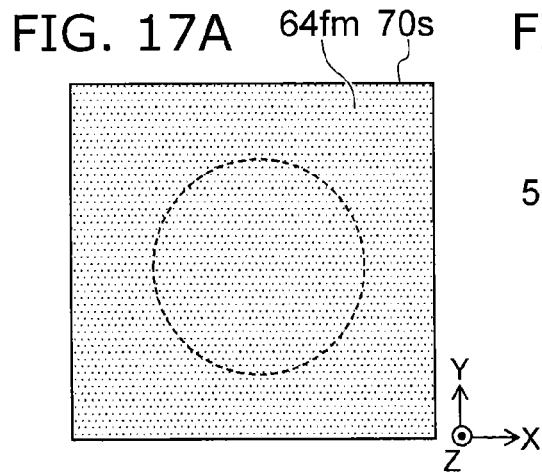
FIG. 17A to FIG. 17E are schematic views illustrating the method for manufacturing the pressure sensor according to the second embodiment.

In step S100 as shown in FIG. 17A, a transducing film 64fm that is used to form the transducing thin film 64 is formed on a substrate 70s. The transducing film 64fm includes, for example, a silicon oxide film. In the case where the fixing unit 67 (e.g., the fixing units 67a to 67d, etc.) is formed to discontinuously hold the edge portion 64eg of the transducing thin film 64, the portions that are used to form the fixing unit 67 may be formed by patterning the transducing film 64fm in this process.

The first conductive layer is formed in step S101. For example, the first conductive layer is formed by forming a conductive film on the transducing film 64fm (or the transducing thin film 64) and patterning the conductive film into a prescribed configuration. The conductive layer may be used to form at least a portion of the first interconnect 57.

The first stacked film 50AS is stacked on the transducing film 64fm in step S102. For example, step S102 includes a first oxidation process of forming a first oxide film that is used to form a first film (step S102a). For example, in step S102, a buffer film, an antiferromagnetic film, a ferromagnetic film, a first oxide film, a magnetic film, an intermediate film, a magnetic film, and a capping film are stacked in this order. At this time, the first oxide film is formed by a first oxidation amount (oxidizing intensity).

Figure 17D:
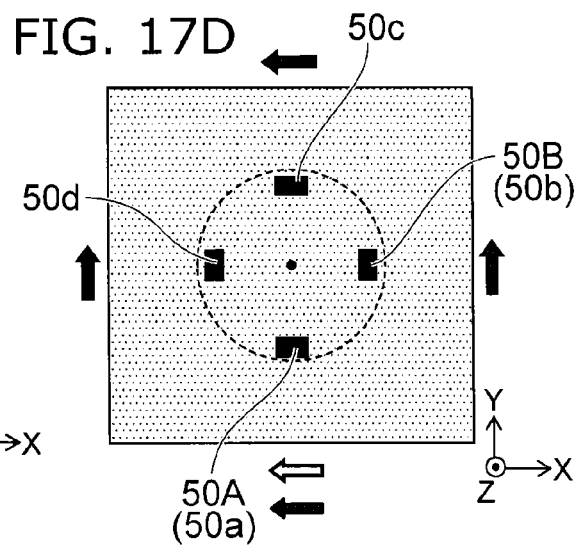
Figure 17B:
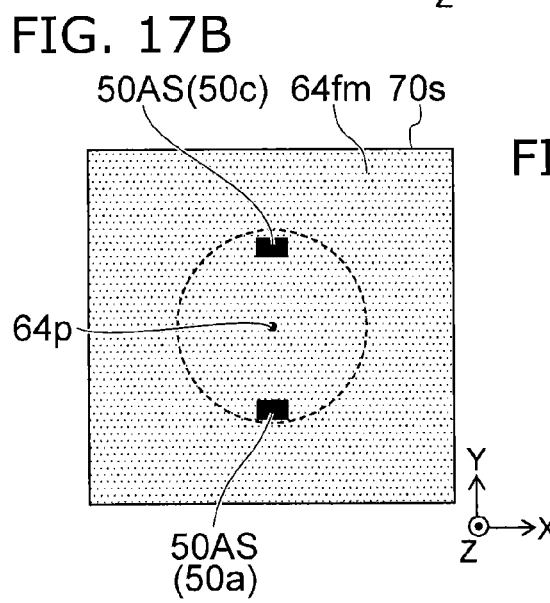

In step S103 as shown in FIG. 17B, the first stacked film 50AS is patterned into a prescribed configuration. The first stacked film 50AS is used to form the first strain sensing element 50A. The first stacked film 50AS may be used to form other strain sensing elements 50 provided on a straight line connecting a position 64p which becomes the centroid 64b and the position where the first strain sensing element 50A is disposed. For example, the first stacked film 50AS may be used to form the strain sensing element 50c.

In step S104, the second stacked film 50BS is stacked on another portion of the first conductive layer. For example, step S104 includes a second oxidation process of forming a second oxide film that is used to form a second film (step S104a). For example, in step S104, a buffer film, an antiferromagnetic film, a ferromagnetic film, a second oxide film, a magnetic film, an intermediate film, a magnetic film, and a capping film are stacked in this order. At this time, for example, the second oxide film is formed by a second oxidation amount (oxidizing intensity). The first oxidation amount (the oxidation amount of the first oxidation process) and the second oxidation amount (the oxidation amount of the second oxidation process) are different from each other.

In the embodiment, for example, the oxidizing intensity of the first oxidation process and the oxidizing intensity of the second oxidation process are different from each other. For example, in one of the first oxidation process or the second oxidation process, oxygen substantially may not be supplied at all. Actually, oxidization may not be performed. For example, one of the first oxidation process or the second oxidation process may be omitted. Such an example is desirable for reducing manufacturing costs.

Figure 17E:
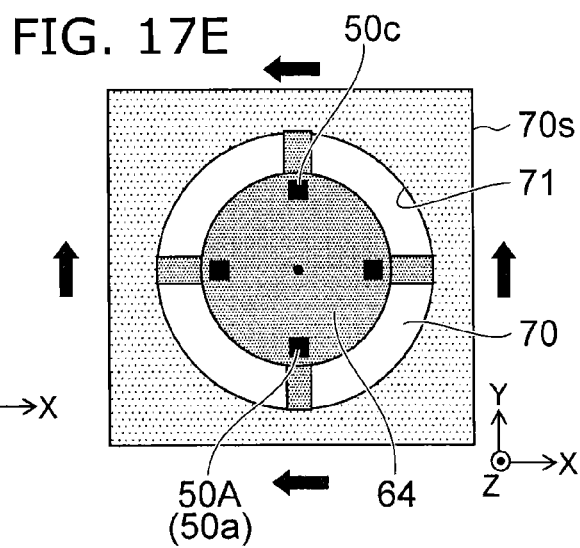
Figure 17C:
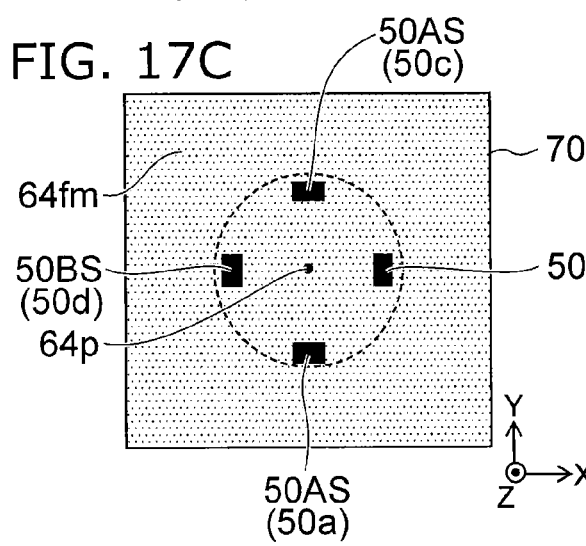

As shown in FIG. 17C, the second stacked film 50BS is patterned into a prescribed configuration in step S105. The second stacked film 50BS is used to form the second strain sensing element 50B. The second stacked film 50BS may be used to form other strain sensing elements 50 provided on a straight line connecting the position 64p which becomes the centroid 64b and the position where the second strain sensing element 50B is disposed. For example, the second stacked film 50BS may be used to form the strain sensing element 50d.

Annealing is performed in a magnetic field in step S106. Thereby, as shown in FIG. 17D, the direction of the magnetization of the fixed magnetic layer (the second magnetic layer 20 and the fourth magnetic layer 20B) is fixed for each of the multiple strain sensing elements 50. The direction of the magnetization of the fixed magnetic layer (the second magnetic layer 20 and the fourth magnetic layer 20B) is a direction that corresponds to the oxygen concentration of the film 44.

In step S107, a conductive film is formed on the strain sensing elements 50 and patterned into a prescribed configuration. Thereby, the second conductive layer is formed. The second conductive layer may be used to form, for example, at least a portion of the second interconnect 58.

As shown in FIG. 17E, etching is performed from the back surface (the lower surface) of the substrate 70s in step S108. The patterning includes, for example, deep-RIE, etc. At this time, a Bosch process may be implemented. Thereby, the hollow portion 70 is made in the substrate 70s.

The portion where the hollow portion 70 is not made is used to form the non-hollow portion 71. Thereby, the transducing thin film 64 is formed. In the case where the fixing unit 67 is formed to continuously hold the edge portion 64eg of the transducing thin film 64, the fixing unit 67 is formed simultaneously with the transducing thin film 64 by etching from the back surface of the substrate 70s.

For example, the film formation and patterning of the first stacked film 50AS and the film formation and patterning of the second stacked film 50BS may be performed simultaneously. In such a case, the process of forming the oxide film is multiply performed when forming the stacked film used to form the multiple strain sensing elements 50.

For example, a buffer film, an antiferromagnetic film, and a ferromagnetic film are formed on the transducing film 64fm. A mask material is formed on these films; and an opening is made at the position where the first strain sensing element 50A is to be formed. The portion at the opening is oxidized. Thereby, the first oxide film is formed (the first oxidation process).

Subsequently, the mask material is removed; and another mask material is formed on the body. An opening is made at the position where the second strain sensing element 50B is to be formed. The portion at the opening is oxidized. Thereby, the second oxide film is formed (the second oxidation process).

The mask material is removed; and a magnetic film, an intermediate film, a magnetic film, and a capping film are formed in this order on the body and patterned. Thus, the patterning to form the first strain sensing element 50A and the patterning to form the second strain sensing element 50B may be performed simultaneously. In other words, at least a portion of step S101 to step S107 may be implemented simultaneously and the order may be interchanged within the extent of technical feasibility.

According to the embodiment, the oxidization amount of the film 44 is adjusted for each of the multiple strain sensing elements 50. Thereby, the sensitivity can be increased for each of the multiple strain sensing elements 50. A highly-sensitive pressure sensor can be provided.

Third Embodiment

Figure 18:
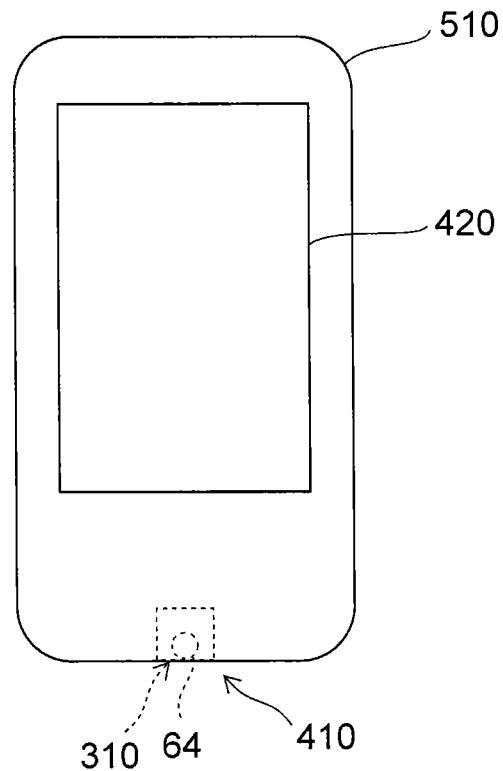
FIG. 18 is a schematic view illustrating a microphone according to a third embodiment.

FIG. 18 is a schematic view illustrating a microphone according to a third embodiment.

As shown in FIG. 18, a microphone 410 according to the embodiment includes any of the pressure sensors according to the embodiments or a pressure sensor of a modification of these pressure sensors. In the example, the pressure sensor 310 is used. The transducing thin film 64 of the pressure sensor 310 in the interior of the microphone 410 is, for example, substantially parallel to the surface of a personal digital assistant 510 where a display unit 420 is provided. However, the embodiment is not limited thereto; and the disposition of the transducing thin film 64 is arbitrary.

Although the microphone 410 is embedded in the personal digital assistant 510, the embodiment is not limited thereto. For example, the microphone 410 may be embedded in an IC recorder, a pin microphone, etc.

Fourth Embodiment

Figure 19:
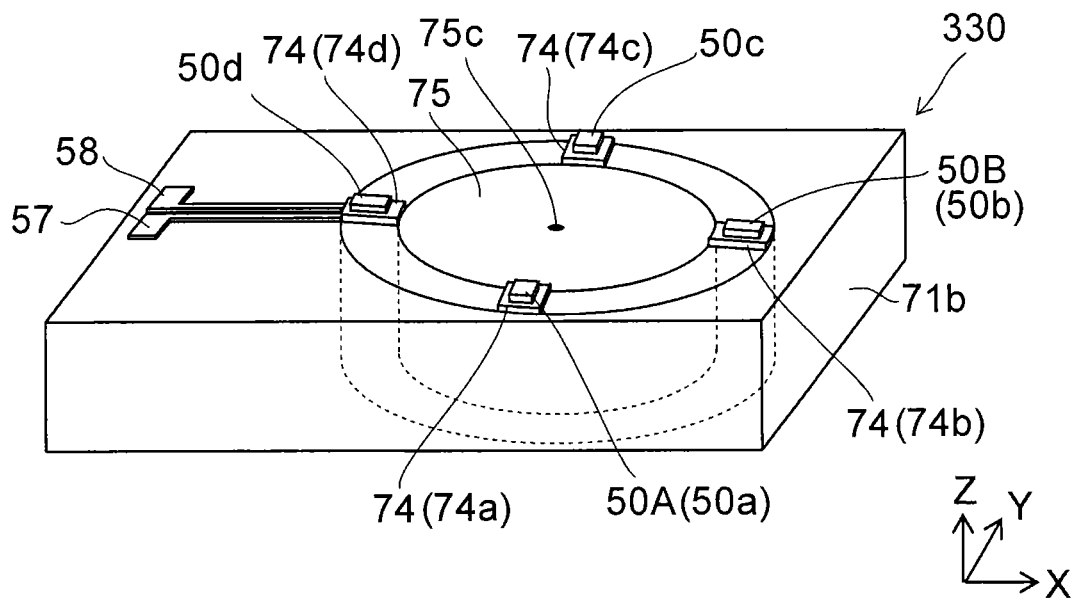
FIG. 19 is a schematic perspective view illustrating an acceleration sensor according to a fourth embodiment.

FIG. 19 is a schematic perspective view illustrating an acceleration sensor according to a fourth embodiment.

Figure 20:
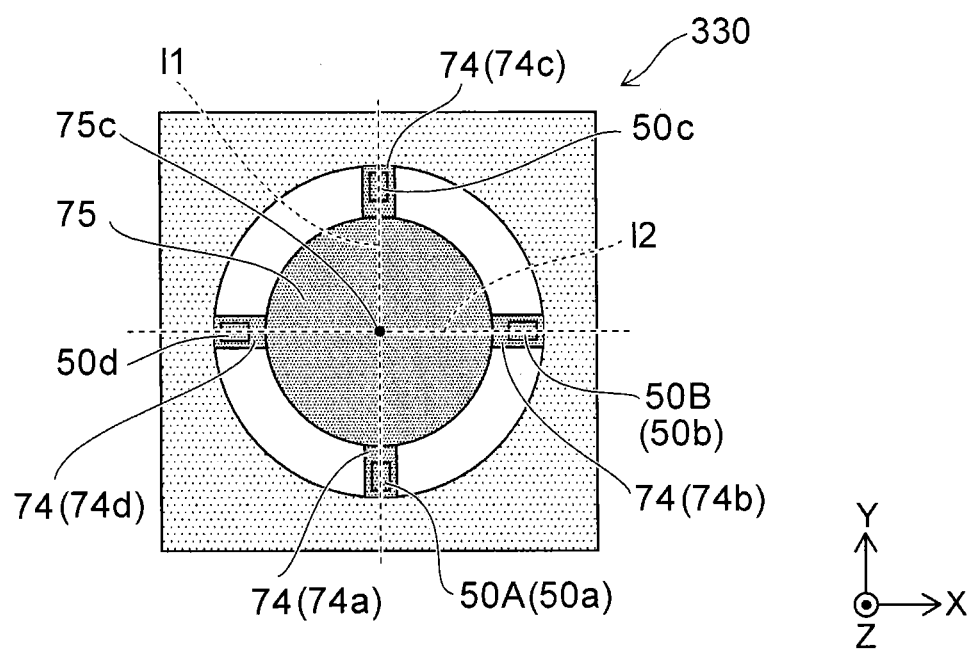
FIG. 20 is a schematic plan view illustrating the acceleration sensor according to the fourth embodiment.

FIG. 20 is a schematic plan view illustrating the acceleration sensor according to the fourth embodiment.

As shown in FIG. 19 and FIG. 20, an acceleration sensor 330 according to the embodiment includes a base unit 71b, a plummet 75, a connector 74, the first strain sensing element 50A, and the second strain sensing element 50B. In the example, the acceleration sensor 330 includes multiple strain sensing elements (the strain sensing elements 50a to 50d). The number of strain sensing elements may be five or more.

The connector 74 connects the plummet 75 and the base unit 71b. The connector 74 is deformable according to the change of the position of the plummet 75 relative to the base unit 71b. The connector 74 includes, for example, a first portion 74a and a second portion 74b. In the example, the connector 74 further includes a third portion 74c and a fourth portion 74d.

The first strain sensing element 50A (the strain sensing element 50a) is provided on the first portion 74a. The second strain sensing element 50B (the strain sensing elements 50b) is provided on the second portion 74b. The strain sensing element 50c is provided on the third portion 74c. The strain sensing element 50d is provided on the fourth portion 74d.

The configuration of the first strain sensing element 50A is similar to the configuration of the first strain sensing element 50A described in the first embodiment. The configuration of the second strain sensing element 50B is similar to the configuration of the second strain sensing element 50B described in the first embodiment.

The first to fourth portions 74a to 74d are separated from each other. In other words, the connector 74 includes multiple portions that are separated from each other. For example, the connector 74 holds multiple portions of the plummet 75 that are separated from each other.

For example, the strain sensing elements 50a to 50d are provided in substantially one plane. For example, a plane is formed parallel to the direction from the first portion 74a toward the third portion 74c and the direction from the second portion 74b toward the fourth portion 74d. In the example, the plane is taken to be the X-Y plane; and a direction perpendicular to the X-Y plane is taken to be the Z-axis direction.

For example, when projected onto the X-Y plane, a line 11 connecting the first strain sensing element 50A and a centroid 75c of the plummet 75 intersects a line 12 connecting the second strain sensing element 50B and the centroid 75c of the plummet 75. In the example, when projected onto the X-Y plane, the line 11 connecting the strain sensing element 50a and the strain sensing element 50c passes through the centroid 75c. In the example, when projected onto the X-Y plane, the line 12 connecting the strain sensing elements 50b and the strain sensing element 50d passes through the centroid 75c. The strain sensing elements 50a to 50d are arranged along an outer edge 75r of the plummet 75. The embodiment is not limited thereto; and the first to fourth portions 74a to 74d may be continuous. Five or more strain sensing elements may be provided on the connector 74.

For example, the position of the plummet 75 relative to the base unit 71b changes when an acceleration is applied to the plummet 75. The connector 74 deforms according to the change of the position of the plummet 75 relative to the base unit 71b. The direction of the magnetization of the magnetic layer of the strain sensing element (e.g., the first strain sensing element 50A and the second strain sensing element 50B) changes according to the deformation of the connector 74. Thereby, for example, the electrical resistance changes due to the MR effect for each of the multiple strain sensing elements. The acceleration is sensed by sensing the change of the resistance corresponding to the change of the direction of the magnetization of the magnetic layer.

The length along the Z-axis direction of the connector 74 corresponds to the thickness of the connector 74. The length along the Z-axis direction of the base unit 71b corresponds to the thickness of the base unit 71b. The thickness along the Z-axis direction of the plummet 75 corresponds to the thickness of the plummet 75. For example, the thickness of the connector 74 is thinner than the thickness of the base unit 71b and thinner than the thickness of the plummet 75.

For example, the length (the thickness) of the connector 74 (the first portion 74a) is shorter (thinner) than the length (the thickness) of the plummet 75 in the direction (e.g., the Y-axis direction) from the base unit 71b toward the plummet 75. For example, the length (the width) of the connector 74 (the first portion 74a) in a direction (the X-axis direction) perpendicular to the direction (e.g., the Y-axis direction) from the base unit 71b toward the plummet 75 is shorter than the length in the Y-axis direction of the connector 74. Thereby, for example, the strain is large (e.g., a maximum) when the plummet 75 moves.

Thereby, for example, the connector 74 deforms more easily than the plummet 75. The connector 74 deforms according to the change of the position of the plummet 75.

For example, the oxygen concentration of the first film 44a, the oxygen concentration of the second film 44b, etc., are appropriately adjusted in the acceleration sensor 330 as well. Thereby, the direction of the magnetization of the fixed magnetic layer is adjusted for each of the multiple strain sensing elements. Thereby, a signal that corresponds to the acceleration can be obtained with high sensitivity in each of the multiple strain sensing elements.

The embodiments comprise a microphone comprising a pressure sensor. The pressure sensor, comprises:
  a base; and
  a sensor unit provided on the base,
  the sensor unit including:
    a transducing thin film having a first surface and being flexible;
    a first strain sensing element provided on the first surface; and
    a second strain sensing element provided on the first surface and separated from the first strain sensing element,
    the first strain sensing element including:
      a first magnetic layer having a first magnetization being changeable;
      a first film including oxygen at a first oxygen concentration;

a second magnetic layer provided between the first magnetic layer and the first film, the second magnetic layer having a second magnetization being fixed; and
a first intermediate layer provided between the first magnetic layer and the second magnetic layer,
the second strain sensing element including:
a third magnetic layer having a third magnetization being changeable;
a second film having a second oxygen concentration different from the first oxygen concentration;
a fourth magnetic layer provided between the third magnetic layer and the second film, the fourth magnetic layer having a fourth magnetization being fixed direction; and
a second intermediate layer provided between the third magnetic layer and the fourth magnetic layer.

In the microphone the transducing thin film is deformable according to a sound wave.

According to the embodiments, a highly-sensitive pressure sensor, acceleration sensor, and method for manufacturing the pressure sensor can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the base, the sensor unit, the transducing thin film, the base unit, the plummet, the connector, the first strain sensing element, the second strain sensing element, the first magnetic layer, the first film, the second magnetic layer, the first intermediate layer, the third magnetic layer, the second film, the fourth magnetic layer, the second intermediate layer, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all pressure sensors, acceleration sensors, and methods for manufacturing pressure sensor practicable by an appropriate design modification by one skilled in the art based on the pressure sensors, acceleration sensors, and methods for manufacturing pressure sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A pressure sensor, comprising:
a base; and
a sensor unit provided on the base,
the sensor unit including:
a transducing thin film having a first surface and being flexible;
a first strain sensing element provided on the first surface; and
a second strain sensing element provided on the first surface and separated from the first strain sensing element,
the first strain sensing element including:
a first magnetic layer having a first magnetization being changeable;
a first film including oxygen at a first oxygen concentration;
a second magnetic layer provided between the first magnetic layer and the first film, the second magnetic layer having a second magnetization being fixed; and
a first intermediate layer provided between the first magnetic layer and the second magnetic layer,
the second strain sensing element including:
a third magnetic layer having a third magnetization being changeable;
a second film having a second oxygen concentration different from the first oxygen concentration;
a fourth magnetic layer provided between the third magnetic layer and the second film, the fourth magnetic layer having a fourth magnetization being fixed direction; and
a second intermediate layer provided between the third magnetic layer and the fourth magnetic layer.

2. The sensor according to claim 1, wherein
the first film includes a first metallic element having a first valence, and
the second film includes the first metallic element having a second valence different from the first valence.

3. The sensor according to claim 1, wherein
the first oxygen concentration of the first film is not less than 20 atomic percent and not more than 70 atomic percent, and
the second oxygen concentration of the second film is not less than 0 atomic percent and not more than 20 atomic percent.

4. The sensor according to claim 1, wherein the first film includes at least one selected from iron, chrome, nickel, and manganese.

5. The sensor according to claim 1, wherein
the first strain sensing element further includes a first ferromagnetic layer,
the first film is provided between the second magnetic layer and the first ferromagnetic layer,
the second strain sensing element further includes a second ferromagnetic layer, and
the second film is provided between the fourth magnetic layer and the second ferromagnetic layer.

6. The sensor according to claim 5, wherein
the first strain sensing element further includes a first antiferromagnetic layer,
the first ferromagnetic layer is provided between the second magnetic layer and the first antiferromagnetic layer,
the second strain sensing element further includes a second antiferromagnetic layer, and
the second ferromagnetic layer is provided between the fourth magnetic layer and the second antiferromagnetic layer.

7. The sensor according to claim 1, wherein a direction from a centroid of the transducing thin film toward the first strain sensing element intersects a direction from the centroid toward the second strain sensing element.

8. The sensor according to claim 1, wherein a distance between the first strain sensing element and a centroid of the transducing thin film is not less than 0.8 times and not more than 1.2 times a distance between the centroid and the second strain sensing element.

9. The sensor according to claim 1, wherein
the sensor unit further includes a fixing unit, and
the fixing unit is connected to an edge portion of the transducing thin film and fixes the edge portion to the base.

10. The sensor according to claim 1, wherein a length of the first strain sensing element along a first direction from a centroid of the transducing thin film toward the first strain sensing element is different from a length of the first strain sensing element along a second direction perpendicular to the first direction.

11. The sensor according to claim 1, wherein at least one selected from the first magnetic layer and the second magnetic layer includes at least one selected from iron, cobalt, and nickel.

12. The sensor according to claim 1, wherein the first intermediate layer includes at least one selected from magnesium oxide, aluminum oxide, titanium oxide, and zinc oxide.

13. An acceleration sensor, comprising:
a base unit;
a plummet;
a connector connecting the plummet and the base unit, the connector being deformable according to a change of a position of the plummet relative to the base unit;
a first strain sensing element provided on a first portion of the connector; and
a second strain sensing element provided on a second portion of the connector, the second portion being separated from the first portion,
the first strain sensing element including:
a first magnetic layer having a first magnetization being changeable;
a first film including oxygen at a first oxygen concentration;
a second magnetic layer provided between the first magnetic layer and the first film, the second magnetic layer having a second magnetization being fixed; and
a first intermediate layer provided between the first magnetic layer and the second magnetic layer,
the second strain sensing element including:
a third magnetic layer having a third magnetization being changeable;
a second film having a second oxygen concentration different from the first oxygen concentration;
a fourth magnetic layer provided between the third magnetic layer and the second film, the fourth magnetic layer having a fourth magnetization being fixed; and
a second intermediate layer provided between the third magnetic layer and the fourth magnetic layer.

14. A method for manufacturing a pressure sensor, the pressure sensor including a base and a sensor unit provided on the base, the sensor unit including a transducing thin film, a first strain sensing element, and a second strain sensing element, the transducing thin film having a first surface and being flexible, the first strain sensing element being provided on the first surface, the second strain sensing element being provided on the first surface and separated from the first strain sensing element, the first strain sensing element including a first magnetic layer, a first film, a second magnetic layer, and a first intermediate layer, the first magnetic layer having a first magnetization being changeable, the second magnetic layer being provided between the first magnetic layer and the first film and having a second magnetization being fixed, the first intermediate layer being provided between the first magnetic layer and the second magnetic layer, the second strain sensing element including a third magnetic layer, a second film, a fourth magnetic layer, and a second intermediate layer, the third magnetic layer having a third magnetization being changeable, the fourth magnetic layer being provided between the third magnetic layer and the second film and having a fourth magnetization being fixed, the second intermediate layer being provided between the third magnetic layer and the fourth magnetic layer, the method comprising:
forming a first oxide film used to form the first film.

15. The method according to claim 14, wherein the first film includes at least one selected from iron, chrome, nickel, and manganese.

16. The method according to claim 14, further comprising forming a second oxide film used to form the second film,
an oxidation amount of the forming of the first oxide film being different from an oxidation amount of the forming of the second oxide film.

17. The method according to claim 14, wherein
the first strain sensing element further includes a first ferromagnetic layer,
the first film is provided between the second magnetic layer and the first ferromagnetic layer,
the second strain sensing element further includes a second ferromagnetic layer, and
the second film is provided between the fourth magnetic layer and the second ferromagnetic layer.

18. The method according to claim 17, wherein
the first strain sensing element further includes a first antiferromagnetic layer,
the first ferromagnetic layer is provided between the second magnetic layer and the first antiferromagnetic layer,
the second strain sensing element further includes a second antiferromagnetic layer, and
the second ferromagnetic layer is provided between the fourth magnetic layer and the second antiferromagnetic layer.

19. The method according to claim 14, wherein
a direction from a centroid of the transducing thin film toward the first strain sensing element intersects a direction from the centroid toward the second strain sensing element.

20. The method according to claim 14, wherein a distance between the first strain sensing element and a centroid of the transducing thin film is not less than 0.8 times and not more than 1.2 times a distance between the centroid and the second strain sensing element.

* * * * *